United States Patent
Rao et al.

(10) Patent No.: US 10,484,451 B2
(45) Date of Patent: Nov. 19, 2019

(54) VIRTUAL NETWORK STATE MANAGEMENT IN MOBILE EDGE COMPUTING

(71) Applicants: Jaya Rao, Ottawa (CA); Xu Li, Nepean (CA); Dilip Andrade, Ottawa (CA)

(72) Inventors: Jaya Rao, Ottawa (CA); Xu Li, Nepean (CA); Dilip Andrade, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/296,797

(22) Filed: Oct. 18, 2016

(65) Prior Publication Data

US 2018/0109590 A1    Apr. 19, 2018

(51) Int. Cl.
| | |
|---|---|
| *H04W 40/00* | (2009.01) |
| *H04L 29/08* | (2006.01) |
| *H04L 29/06* | (2006.01) |
| *H04W 40/20* | (2009.01) |
| *H04W 4/029* | (2018.01) |
| *G06F 9/50* | (2006.01) |

(52) U.S. Cl.
CPC ............ *H04L 67/04* (2013.01); *G06F 9/5077* (2013.01); *H04L 67/289* (2013.01); *H04L 67/327* (2013.01); *H04L 67/42* (2013.01); *H04W 4/029* (2018.02); *H04W 40/20* (2013.01)

(58) Field of Classification Search
CPC .................... H04W 36/00; H04W 36/0022
See application file for complete search history.

(56) References Cited

U.S. PATENT DOCUMENTS

| | | | |
|---|---|---|---|
| 2009/0109925 A1* | 4/2009 | Nakamura | H04L 63/062 370/331 |
| 2012/0044838 A1* | 2/2012 | Yi | H04W 36/0022 370/260 |
| 2013/0244612 A1 | 9/2013 | Burckart et al. | |
| 2013/0244711 A1 | 9/2013 | Burckart et al. | |

(Continued)

FOREIGN PATENT DOCUMENTS

| | | |
|---|---|---|
| CN | 103312768 A | 9/2013 |
| CN | 105578199 A | 5/2016 |

(Continued)

OTHER PUBLICATIONS

International Search Report dated May 27, 2017 for corresponding International Application No. PCT/CN2016/103224 filed Oct. 25, 2016.

(Continued)

*Primary Examiner* — Justin Y Lee

(57) ABSTRACT

In an embodiment a method is provided for processing a computational task using a network node available on a network processing. The method including the network node performing the steps of processing a computational task, and transmitting at least one snapshot of state data related to the computational task to a UE associated with that computational task. The at least one snapshot of state data enables the UE to resume processing of the computational task from a snapshot point represented by the state data.

18 Claims, 21 Drawing Sheets

(56) References Cited

U.S. PATENT DOCUMENTS

| | | | |
|---|---|---|---|
| 2014/0280470 A1* | 9/2014 | Calo | H04L 67/148 709/203 |
| 2017/0086111 A1 | 3/2017 | Vrzic et al. | |
| 2017/0272380 A1 | 9/2017 | Rao et al. | |
| 2018/0213453 A1 | 7/2018 | Vrzic et al. | |

FOREIGN PATENT DOCUMENTS

| | | |
|---|---|---|
| CN | 105975330 A | 9/2016 |
| EP | 2053886 A2 | 4/2009 |
| WO | 2016128055 A1 | 8/2016 |

OTHER PUBLICATIONS

Feasibility Study on New Services and Markets Technology Enablers; 3GPP TR 22.891 V14.2.0 (Sep. 2016).

* cited by examiner

VIRTUAL NETWORK STATE MANAGEMENT IN MOBILE EDGE COMPUTING

FIELD

The present invention pertains to the field of telecommunications. In particular, this application relates to mobile edge computing, where a device offloads computations to computing resources available on a connected network.

BACKGROUND

In a wireless network, Mobile Edge Computing (MEC) allows for computing functions to be located near the radio edge of the network. This allows for a reduction in the latency of communications between a requesting User Equipment (UE) and the computing function. Reducing latency is important in many real-time computing applications including either computing, or assisting in the computation of, a trajectory for a mobile device, including user equipment (UE), autonomous vehicles, unmanned aerial vehicles (UAVs), as well as computing or assisting in the computation of control information for connected devices including robots, tele-robots, and similar computing devices. In some embodiments, MEC is used by UEs to offload computations, data handling, or other computing task to more robust, or better connected, computing functions within the network. MEC is typically useful in scenarios including computationally intensive tasks and data intensive tasks.

The UE can connect to the network to access a MEC resource in order to communicate with a network function (NF), physical NF (non-virtualized) or virtualized NF, located at a network node located near the edge of the network ("edge NF"). The edge NF can include, an edge application function which may be located within a cloudlet, a cloud server, a database, a datastore, or a combination of the above. The network node that supports a MEC resource may be referred to as a mobile edge computing node (MEC-N).

Where the UE is both supported by a mobile network, and is not fixed in location (e.g. a connected vehicle, or a UAV), the MEC-N typically includes functionality to maintain a communication channel with the UE that has the similar characteristics to those initially configured. By placing the network function near the radio edge, a low latency can be achieved, but as the UE moves through the network, the network function also has to move so that it can maintain a similar topological distance from the UE and keep the communications latency sufficiently low. This requires network support for moving the function through the network. This may be achieved through using a plurality of network functions in different locations in the network. As the UE moves through the network, the NF associated with the UE is changed to the next NF in the network along the UE's path. The NF can be modelled by a set of state information characterizing the NF. By moving the state information associated with the NF to a second NF, the network can have the second NF effectively pick up where the original NF left off. This allows the NF serving the UE to effectively move through the network with the UE. In embodiments where the NF is virtualized in the network, the network may undertake the instantiation and configuration of virtualized NFs (VNFs) along a projected path of the UE. The state of the previous VNF can be moved to an instantiated and configured VNF at the time that the VNF is activated. Where NFs are not virtual, they can be configured but assigned an inactive mode until, like in the virtualized case, the UE is within a defined distance, at which point they can be set to an active mode and provided the state information In some cases, such as when the UE trajectory is known, the NF serving the UE can be migrated to be topologically located adjacent to, or even co-located with, a next anticipated AP.

In cases where the UE trajectory is uncertain however, the UE path is unpredictable. The trajectory may be uncertain, for instance, when the UE has motion that is autonomous (or semi-autonomous) from the network and MEC. In these cases, the network entities have a lower certainty in predicting a suitable next location for the NF.

Therefore, there is a need for a MEC solution that is robust, and is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

In a first aspect of the present invention, there is provided a method for execution by a User Equipment. The method comprises receiving first state data associated with a first network function over a wireless connection to a first mobile network access node; and transmitting, to a second mobile network access node, second state data determined in accordance with the first state data.

In an embodiment of the first aspect, the UE processes the first state data to obtain the second state data. In another embodiment, the first state data is transmitted by a first Mobile Edge Computing (MEC) service provider, and received via the first mobile network access node, and optionally, the second state data is transmitted to a second MEC service provider via the second mobile network access node. In a further embodiment, prior to the step of receiving the first state data, the method includes transmitting a request, to a Mobile Edge Computing (MEC) service provider, to offload a computational task to the first network function. In another embodiment, the first mobile network access node and the second mobile network access node belong to different mobile networks. In a further embodiment, before receiving the first state data from the first network node, the UE can transmit a request for state data to the first mobile network access node. In another embodiment, the first state data comprises information selected from the list consisting of: trajectory information, current state information, context information, video analytic information, object identification information, tracking information. In another embodiment, the UE comprises an autonomous mobile device. In another embodiment, the first state data is at least partially processed by the first network node.

In a second aspect of the present invention, there is provided a UE comprising a radio access network interface; a processor; and a memory. The memory stores instructions that when executed by the processor cause the UE to carry out the methods of the first aspect and its embodiments.

In a third aspect of the present invention, there is provided a method for processing a computational task at a network function in a mobile edge computing service provider. The method comprises processing the computational task; and in response to receipt of an instruction, transmitting state data representative of the state of the network function and associated with the processed computational task towards a UE associated with the computational task.

In embodiments of the third aspect, the method further comprises in advance of processing the computational task, receiving a request, associated with the UE, to process the computational task, the request including second state data representative of the state of another network function processing the computational task. In another embodiment, the received instruction includes an indication that the UE is leaving a network region served by the mobile edge computing service provider. In a further embodiment, transmitting state data towards the UE includes transmitting state data to a node within a mobile network associated with the UE. In another embodiment, transmitting state data towards the UE includes transmitting state data to the UE via a mobile network access node.

BRIEF DESCRIPTION OF THE FIGURES

Further features and advantages of the present invention will become apparent from the following detailed description, taken in combination with the appended drawings, in which:

FIG. 3b is a signalling diagram illustrating an embodiment of operations to enable the UE to offload the computational task, based on the system architecture of FIG. 3a.

It will be noted that throughout the appended drawings, like features are identified by like reference numerals.

DETAILED DESCRIPTION

Figure 1:
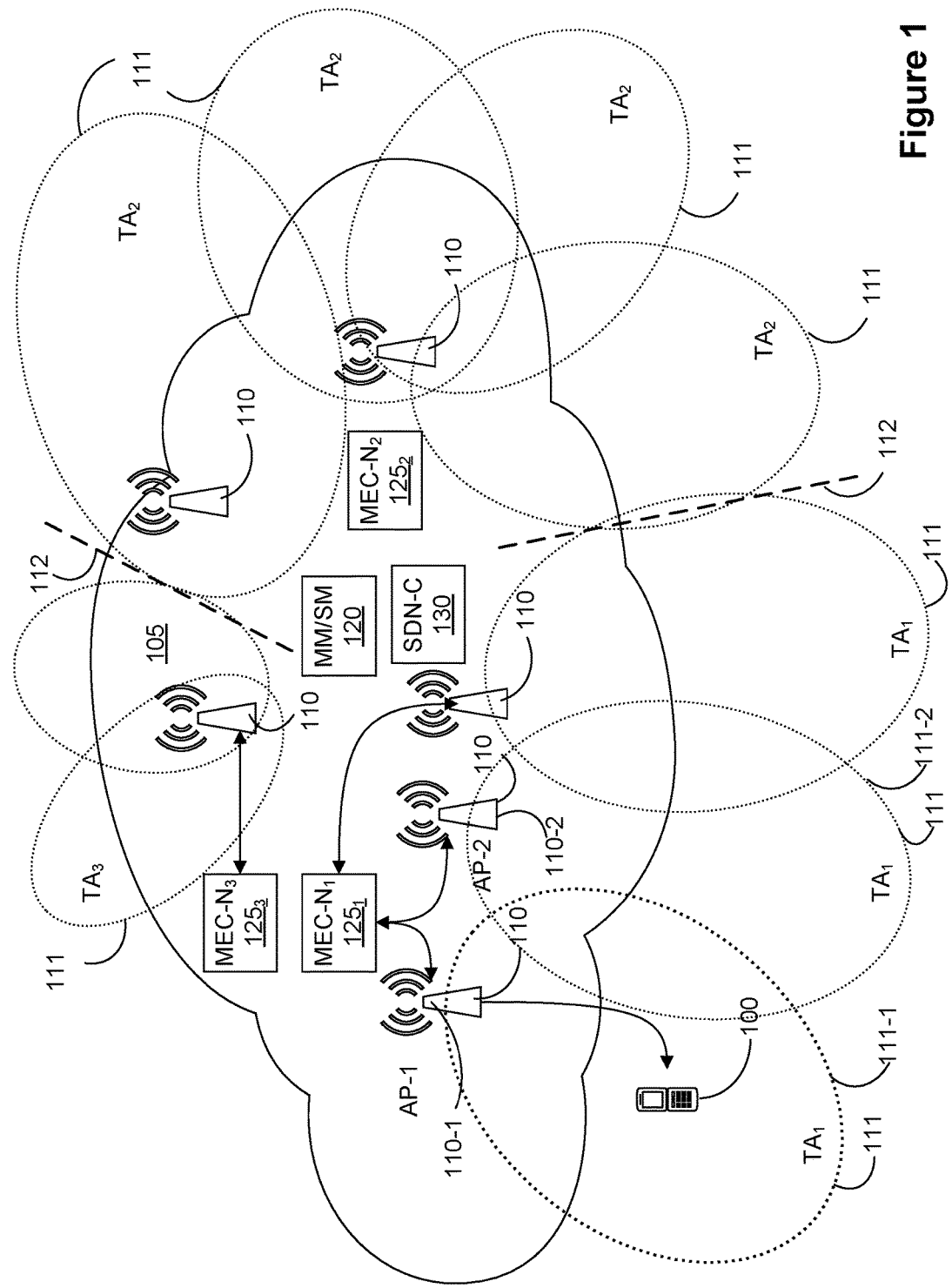
FIG. 1 illustrates an exemplar network block diagram.

In an implementation, the present application provides for a system and method that provides computational services at the edge of a mobile network. In an aspect, the computational services may serve UEs connecting to the network. In an aspect, a system and method is provided that allows UEs to offload computational tasks to a NF supported by a MEC-N available on the network.

In one embodiment, the system and method provide a mechanism for the movement of state information from one MEC resource to another that does not require the state information to be passed directly from one MEC resource control entity to another. This allows a MEC resource control entity to either instantiate a virtual function, or allocate resources in a physical function, without concern for the state. This allows the MEC resource control entity to treat the newly created or allocated functions as stateless. The state information is maintained by having it transmitted towards the UE, and then transmitted back up to the new function.

In an aspect, the UE can continue processing after receiving the state information from the NF, and then transmit the updated state information to the NF.

In an aspect, a new or subsequent NF may take over the offloaded computational tasks using state information provided by the UE.

In an implementation, a method is provided for a User Equipment (UE) to offload a computational task onto a network node available on the network. The method comprising the UE: transmitting a network function (NF) image and associated information to the network node, the NF image to be initialized by the network node to perform the offloaded computational task; receiving from the network node at least one interim response including an interim state of the NF, wherein the interim state of the NF may be used to continue the computational task from the interim state. In an aspect, the UE may continue the computational task from the interim state.

In an aspect, wherein a different network node may continue the computational task from the interim state, and wherein the method further comprises the UE: transmitting the interim state to the different network node.

In an aspect, the network node comprises a mobile edge computing node (MEC-N).

In an aspect, the method further comprises the UE: receiving from the network node a final response including at least a final result of the computational task.

In an aspect, the method further comprises the UE: processing the NF image based on the received at least one interim response to produce at least one of a further interim response and a final result.

In an aspect, the UE is connected to the network by a first access point when performing the method steps, and wherein the UE transitions to connect to the network by a second target access point, the method further comprising the UE: receiving from the second target access point at least one of an additional interim response and a final result of the computational task. The at least one of an additional interim response and a final result of the computational task may be forwarded by the second target access point on behalf of the network node. The at least one of an additional interim response and a final result of the computational task may be forwarded by the second target access point on behalf of a different network node. In an aspect, the method further comprises, the UE: transmitting to a different network node an updated NF image and associated information based upon the at least one interim response received from the network node.

In an aspect, the updated NF image and associated information may correspond to the interim state of the NF received from the network node. In an aspect, the updated NF image and associated information may correspond to an updated interim state of the NF after further computations by the UE using the received interim state.

In an implementation, a User Equipment (UE) may be provided. The UE operative to connect to a network and to offload a computational task onto a network node available on the network, the UE comprising the UE operative to: transmit a network function (NF) image and associated information to the network node, the NF image to be initialized by the network node to perform the offloaded computational task; and receive from the network node at least one interim response including an interim state of the NF, wherein the interim state of the NF may be used to continue the computational task from the interim state.

In an aspect, the UE is operative to continue the computational task from the interim state. In an aspect, the UE is further operative to transmit the interim state to a different network node to continue the computational task.

In an aspect, the UE is further operative to receive from the network node a final response including at least a final result of the computational task.

In an aspect, the UE is further operative to process the NF image based on the received at least one interim response to produce at least one of a further interim response and a final result.

In an aspect, the UE is further operative to: connect to the network by a first access point to transmit the MEC session request; transition to connect to the network by a second target access point; exchange control signalling with the second target access point; and, receive from the second target access point at least one of an additional interim response and a final result of the computational task.

In an aspect, the UE is further operative connect to the second access point to transmit to a different network node an updated NF image and associated information based upon the at least one interim response received from the network node.

In an aspect, the updated NF image and associated information corresponds to the interim state of the NF received from the network node.

In an aspect, the UE is operative to produce the updated NF image and associated information by continuing the computational task from the interim state.

In an implementation, a method is provided for offloading a computational task from a User Equipment (UE) connected to a network, comprising a network node available on the network: receiving a request sent by the UE to allocate computing resources for the offloaded computational task; setting up computing resources corresponding to the requests to allocate computing resources; receiving path forwarding rules for the communication path between the network node and the UE; receiving from the UE an application network function (NF) image corresponding to the computational task; and, transmitting to the UE at least one interim response including an interim state of the NF, wherein the interim state of the NF may be used to continue the computational task from the interim state.

In an aspect, the method further comprises the network node: receiving a calculation interrupt command; freezing the computation task in a current state; and, transmitting the current state data to the UE.

In an aspect, before the network node transmits the current state data to the UE the method further comprises the network node: receiving path forwarding rules for the communication path between the network node and the UE; and, wherein the transmitting the current state data to the UE comprises transmitting the current state data to the UE using the received path forwarding rules.

In an aspect, the network node communicates with the UE via a first access point when performing the steps of the method discussed above, and wherein the received path forwarding rules provide instructions for the network node to communicate with the UE via a second target access point.

In an aspect, the method further comprises the network node: exchanging the path forwarding rules with the second target access point.

In an aspect, the network node comprises a mobile edge computing node (MEC-N).

In an aspect, the method further comprises the network node: transmitting to the UE a final response including at least a final result of the computational task.

In an aspect, the at least one of an additional interim response and a final result of the computational task is forwarded by the second target access point on behalf of the network node.

In an aspect, the method further comprises the network node: periodically storing snapshots of a current NF state; and, wherein the transmitting to the UE the at least one interim response comprises transmitting the periodically stored snapshots of the current NF state.

In an aspect, the method further comprises the network node: receiving a snapshot rate update request; and, in response to the snapshot rate update request, changing a periodicity of the periodically transmitted and stored snapshots of the current NF status.

Referring to FIG. 1, an exemplary network block diagram is presented. In the example of FIG. 1, a network 105 connects a plurality of access points (APs) 110. Each of the access nodes 110 supporting at least one coverage area 111. Adjacent coverage areas 111 of APs may be grouped together to form tracking areas (TAs), identified as $TA_1$, $TA_2$, $TA_3$ in FIG. 1. APs 110 grouped to serve a single TA may form a MEC group. MEC group boundaries 112 identify a demarcation between MEC groups.

A UE 100, depicted as a smartphone in this example, is connected to AP-1 100-1 within its corresponding coverage area 111-1, which forms part of the first tracking area $TA_1$. If the UE 100 moves out of coverage area 111-1 into the adjacent coverage area 111-2, it moves between AP from AP-1 100-1 to AP-2 100-2 in an intra MEC group transition. If the UE 100 moves out of coverage area 111-1 into a different TA (e.g. $TA_2$, $TA_3$), it moves in an inter-MEC group transition and service will be provided by a different MEC. Finally, if the UE 100 moves out of all coverage provided by the network 105 to coverage provided by a second network, it moves in an inter-network transition. Location, congestion, transition (different geographic networks, different overlapping networks (intra country), different processing service provider, different communications providers.

In FIG. 1 a mobility management/session management entity (MM/SM) 120 and a software-defined network controller (SDN-C) 130 are operative on the network 105. The MM 120 and the SDN-C 130 provide management and control functions to enable and support NFs, and one or more network nodes, identified as MEC nodes (MEC-Ns) 125 in FIG. 1. The MM 120 provides for MEC-N management, and UE location tracking. The SDN-C 130 sends instructions to nodes in the user plane (UP) to configure them to create a UP path between each MEC-N and corresponding AP 110 in response to a session request submitted by the UE 100. The MEC-N 125 are each operative to provide processing services to UEs connecting to one of a set of APs 110. While FIG. 1 illustrates a single MEC-N for each AP 110, in some implementations a plurality of MEC-N may serve an overlapping one or more AP 110, depending upon network requirements.

Figure 2A:
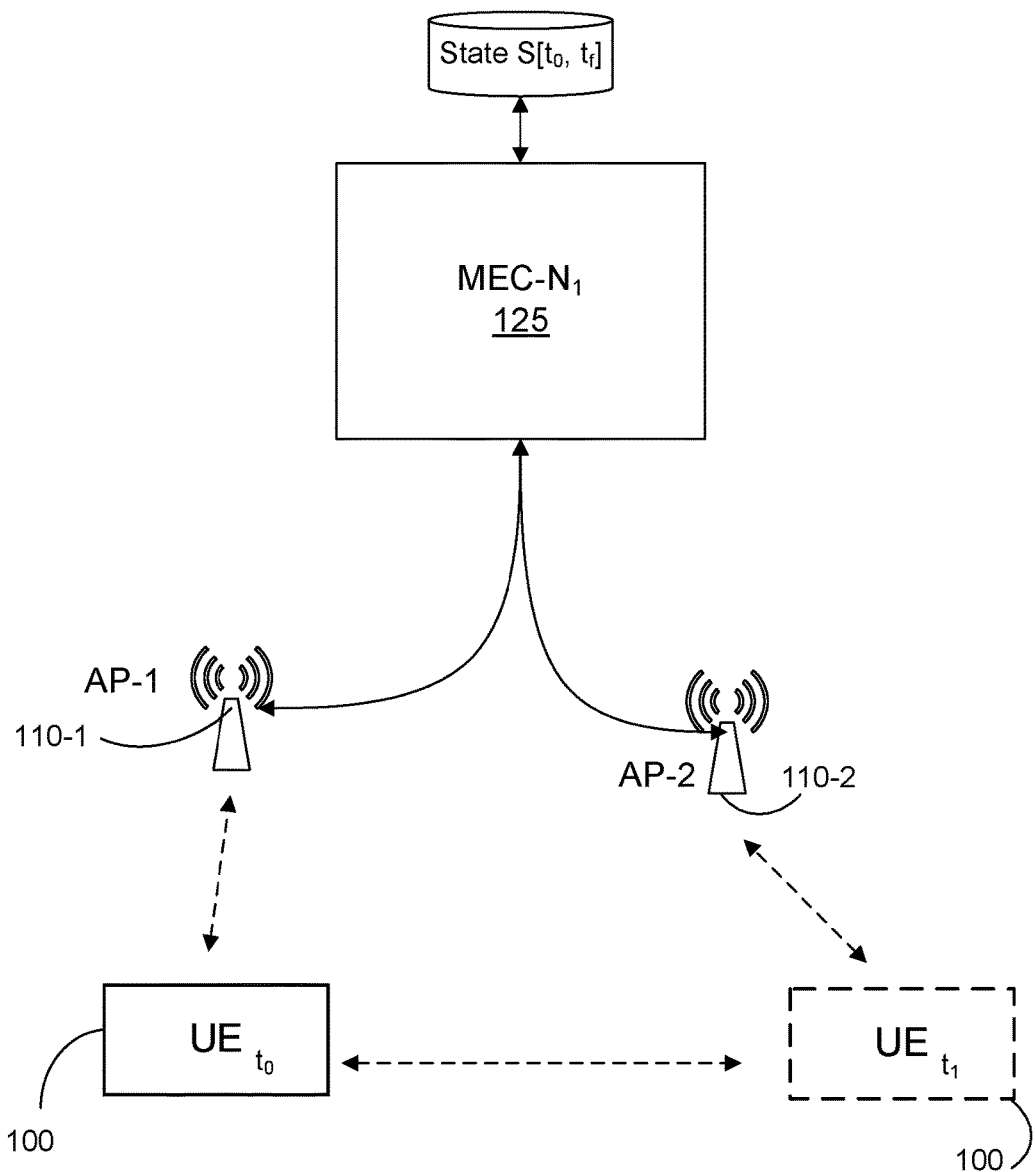
FIGS. 2A and 2B are a simplified block diagrams illustrating embodiments of network connections for a UE to offload a computational task onto a MEC-N available on the network.

Referring to FIG. 2A, a simplified block diagram is illustrated showing the network connections for a UE 100 to offload a computational task onto a MEC-N available on the network 105. At time $t_0$, the UE 100 is located within the coverage area served by AP-1 100-1. To offload a computational task, the UE 100 accesses the network 105 through AP-1 100-1 to request that a MEC session be initiated with a set of service parameters. In accordance with the service parameters, the MEC session is initiated with a MEC node located at the edge of the network 105 and serving AP-1 110-1 (i.e. MEC-$N_1$ 125 in the example of FIG. 2A). After the MEC session request has been acknowledged, the UE 100 may exchange control signalling with the AP-1 110-1 and the MEC-$N_1$ 125. After the exchange of control signalling, the UE 100 may be associated with an NF on the MEC-$N_1$ 125. In an aspect, as described in further detail below, the UE 100 may transmit a software image of the NF to the MEC-$N_1$ 125 for execution. In this regard, the software image of the NF refers to the application or computational task executed by the NF which can be paused, structured in a portable form, transportable between different virtualized or non-virtualized NF. In an aspect, the UE 100 may call a NF resident on, or accessible to, the MEC-$N_1$ 125. The UE 100 may further transmit instructions, parameters, binaries, libraries, data, or other information required for operation of the NF on the MEC-$N_1$ 125, to offload the computational task to the MEC-$N_1$ 125. In some embodiments, the MEC NF is a physical NF dedicated to a particular purpose. In other embodiments, the request for a MEC session may result in the instantiation of a Virtual NF which may either use a defined VNF accessible to the network, or it may use a software image provided by the UE 100 as described above.

After the UE 100 has offloaded the computational task onto the MEC-$N_1$ 125, it may move locations by time $t_0$, where it is now within the coverage area of AP-2 110-2. Because AP-2 110-2 is also served by MEC-$N_1$ 125, this is an intra MEC group transition and the MEC-$N_1$ 125 can continue processing the offloaded computation task. The UE 100 does need to exchange control signalling with the AP-2 110-2 and the MEC-$N_1$ 125, as will be discussed in more detail below.

In order to facilitate movement of the UE 100, the MEC-$N_1$ 125 exchanges state data relating to a current NF state with the UE 100. In an aspect, the MEC-$N_1$ 125 exchanges the state data with the UE 100 at regular, predetermined intervals. In an aspect, the MEC-$N_1$ 125 exchanges the state data with the UE 100 at regular, e.g. pre-determined or pre-calculated, intervals. In an aspect, the MEC-$N_1$ 125 exchanges the state data with the UE 100 at intervals relating to completion by the NF of specific computational tasks. Exchanging the state data based upon task completion may be useful, for instance, where the computational tasks are time-sensitive or location-specific such that the result may become redundant after a period of time, or position change of the UE 100. In an aspect, the MEC-$N_1$ 125 exchanges the state data with the UE 100 at intervals relating to a current location status of the UE 100. In particular, the MEC-$N_1$ 125 may exchange the state data with the UE 100 when the UE 100 is nearing or traversing a coverage boundary. The coverage boundary may include a boundary between APs, a boundary between network MEC groups, or a boundary between networks, for instance.

In an implementation, the exchanged state data may include state identifying information. In an aspect, the state identifying information may include at least one of a state chronology identifier and a state identifier. The UE 100 may store the state identifying information and, if necessary, in an implementation use the state identifying information to continue or complete the computational task without further assistance from the MEC-$N_1$ 125. In the case of intra MEC group transitions, while state identifying information may be transmitted towards UE 100 before the UE 100 transitions from the previous AP to a current AP, the NF may remain resident on the MEC-$N_1$ 125. In the case of inter-MEC group or inter-network transitions, the UE 100 may request instantiation of a new NF at a new MEC node, for instance MEC-$N_2$ 125, and provide the latest state identifying information to the new MEC node. This allows for the state information to be transferred from one MEC resource to another.

Figure 2B:
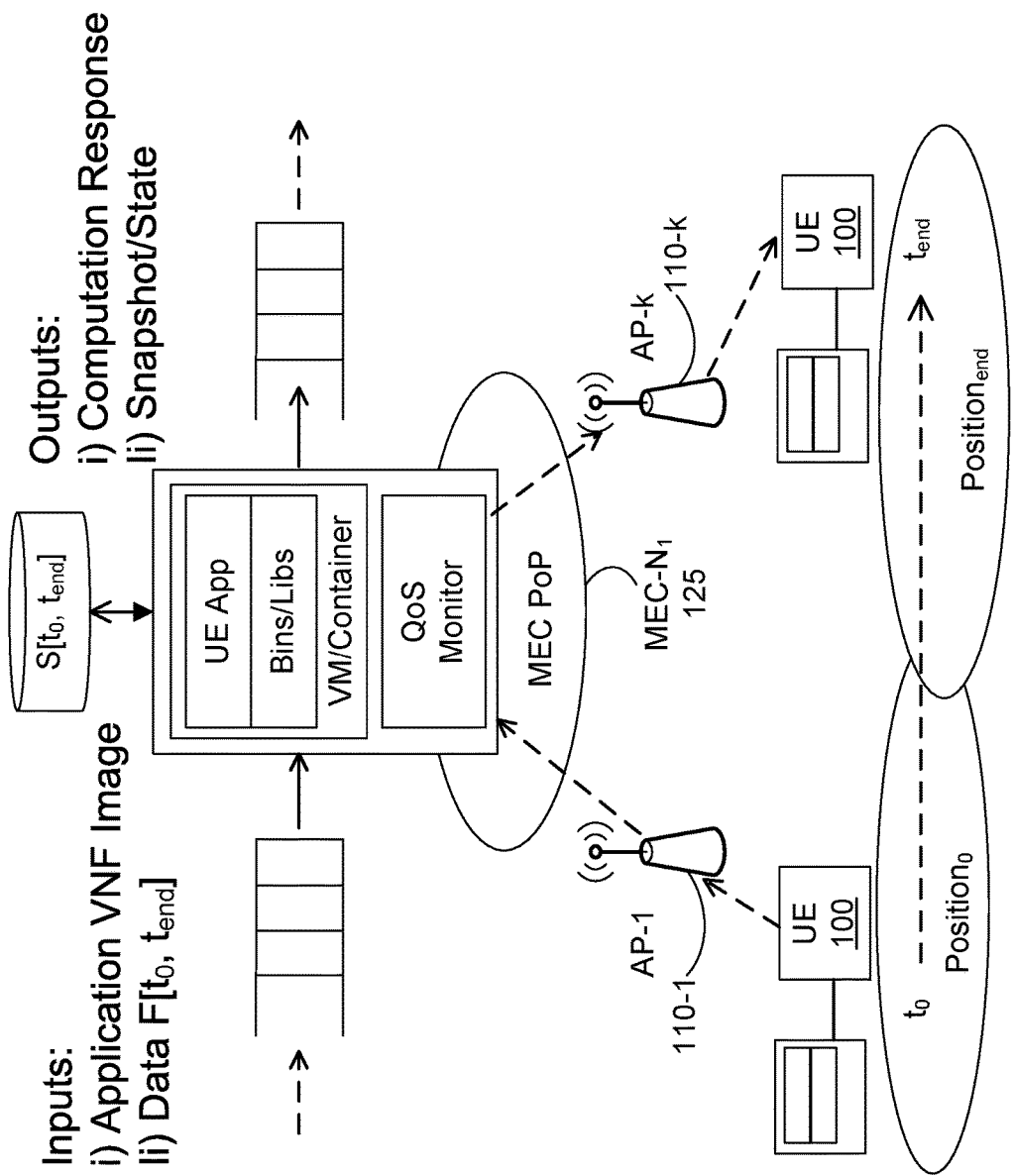

Referring to FIG. 2b, a block diagram illustrates an embodiment of the network connections, data exchanges, and functions for a UE 100 to offload a computational task onto a MEC-N available on the network 105. FIG. 2b builds from the simplified block diagram of FIG. 2a.

In FIG. 2b, the UE 100 is illustrated as transitioning from position$_0$ at time $t_0$ to position$_{end}$ at time $t_{end}$. At position$_0$ the UE 100 connects to AP-1 110-1 to request a MEC session with the MEC-$N_1$ 125. The MEC-$N_1$ 125 is located at the network edge, and is equipped to provide the requisite computing and storage resources to support the MEC session request. As illustrated, the MEC-$N_1$ 125 may include a virtual machine or container that is allocated with sufficient processing, memory and IO resources to support the UE 100 by assuming an offloaded computational task (e.g. by operation of an NF) to serve the MEC session request.

The container may hold, for instance, a UE application, or a NF to perform the functions requested by the UE, along with the requisite binaries or libraries to execute the application/NF. The container may also hold data used by the application/NF. In the embodiment of FIG. 2b, the MEC-$N_1$ 125 further includes a QoS monitor that monitors the performance of the MEC-$N_1$ 125 and may provide QoS feedback to QoS entities on the network 105. Either a part of the MEC-$N_1$ 125, or in communication with the MEC-$N_1$ 125, is a state data-store which retains NF snapshots. Each of the NF snapshots stored in association with a corresponding NF state identifier that indicates the computation context associated with that NF snapshot at that snapshot point (i.e. the state of the computational task at the time of the snapshot). The NF snapshots, along with their corresponding NF state identifiers, may be captured and stored based upon: i) timed intervals; a state of the NF; a location or movement condition of the UE 100; and/or iv) other network/MEC requirements. Each NF snapshot allows for resumption of the computations at another node using the computation context at the time of the NF snapshot.

In addition to the MEC session request, the MEC-$N_1$ 125 is operative to receive inputs related to the MEC session request from the UE 100. In the embodiment of FIG. 2b, the MEC-N$_1$ 125 takes as inputs i) an image of the application to be executed as an NF (which may include associated binaries, libraries, or pointers to binaries/libraries accessible to MEC-N$_1$ 125); ii) and, data associated with the application. In the example of FIG. 2b, the data is illustrated as being a function of a time or sequence defined traffic flow F[t$_0$, t$_{end}$], for a given time segment t$_0$ to t$_{end}$ which may be provided by the UE 100 to the MEC-N$_1$ 125 through the AP-1 110-1 uplink. As also illustrated, the MEC-N$_1$ 125 updates the state data-store with state information corresponding to the data flow segment F[t$_0$, t$_{end}$]. As will be appreciated, in some aspects the data may comprise a static data upload, or pointer/indicator/address to data available to the MEC-N 125. The present application describes the uplink and signalling assuming the NF utilises a data flow, the more complete solution, but this is not intended to be limiting and the single data upload embodiment is contemplated and included in the present invention.

The MEC-N$_1$ 125 may perform the computing/processing tasks defined by the NF image, and store the NF snapshots and corresponding NF state identifiers in the state data-store as described above. The MEC-N$_1$ 125 communicates a computation response, i.e. a result or interim result from the computational task, to the UE 100 in a downlink connection. Where the computation response is an interim computation response, the MEC-N$_1$ 125 may further provide state data with the UE 100. The state data may be used by the UE 100 to resume the computation from the snapshot point represented by the state data, either at the UE 100, the MEC-N$_1$ 125, or another MEC-N$_n$ 125.

Figure 2C:
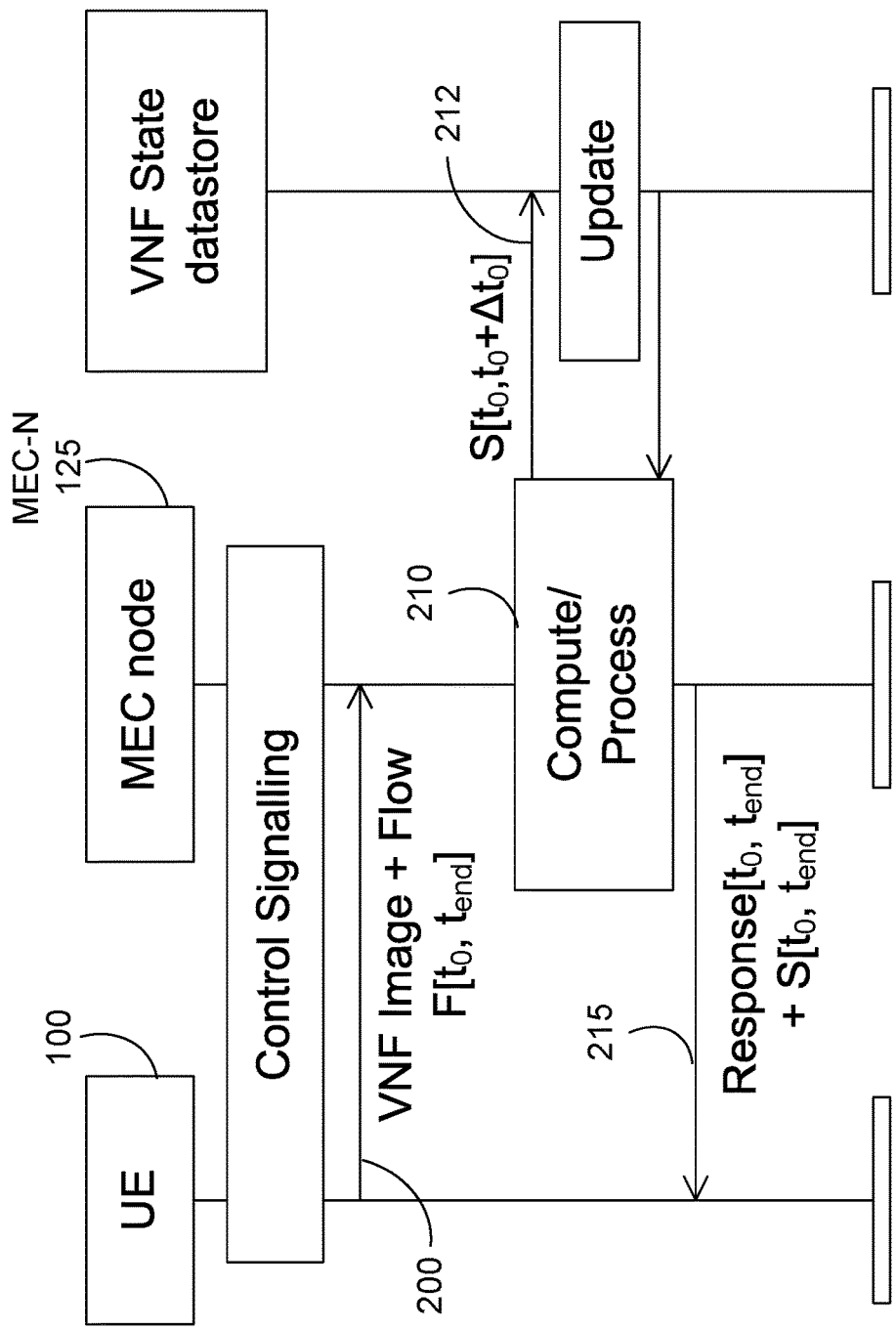
FIG. 2C is a signalling diagram illustrating an embodiment of a UE offloading a computational task onto a MEC-N available on the network.

Referring to FIG. 2c, a signalling diagram is presented illustrating the basic operations for the embodiment described above. After initiating a MEC session, in step 200 the UE 100 transmits a NF Image and flow data F[t$_0$, t$_{end}$] for a time segment, i.e. a data segment, to the MEC-N$_1$ 125. In step 210 the MEC-N$_1$ 125 carries out computations/processing corresponding to the functions requested of the NF and the flow data F[t$_0$, t$_{end}$]. In step 212 the MEC-N$_1$ 125 updates the NF state data-store with state information as the computations/processes progress. This may be done at fixed time intervals, or where certain data results are available (e.g. when a discrete task has been completed). The NF state data-store may return an acknowledgement in response to receiving the state updates from the MEC-N$_1$ 125. In step 215 the MEC-N$_1$ 125 transmits a MEC response [t$_0$, t$_{end}$] and corresponding state data S [t$_0$, t$_{end}$] to the UE 100. As explained above, the MEC response [t$_0$, t$_{end}$] may comprise an interim result of the computations along with interim state data relating to the state of the computational task up to the interim result. The state data may be used by the UE 100 to resume computations (or initiate computations) without use of a MEC-N.

Figure 3A:
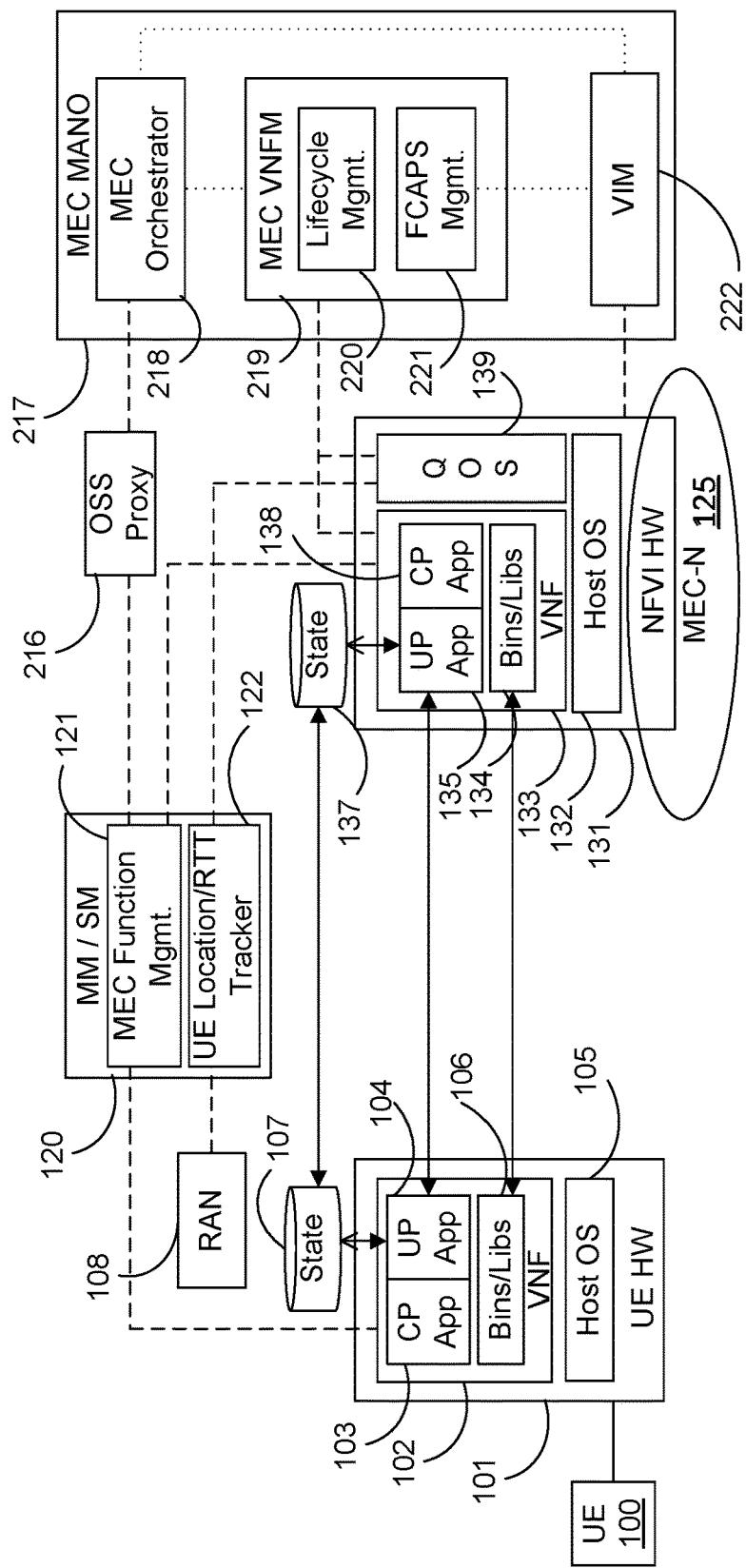
FIG. 3a is a block diagram illustrating an embodiment of a MEC system architecture.

FIG. 3a is a block diagram illustrating an embodiment of a MEC system architecture. The UE 100 includes UE hardware (UE HW) 101 that supports processing elements, memory, storage, and IO functionality in order to execute and support a control plane application (CP App) 103, a user plane function (UP app) 104, storage, and optionally execution, of the computational task (NF) 102, associated binaries and libraries 106 to be used by the NF, a UE state datastore 107, and a host operating system (host OS) 105.

In addition to its main network operations functionality, the MM/SM 120 supports a MEC Function management entity 121 that receives the MEC session request from the UE 100, and manages the initialization of the NF at the MEC-N 125. Where the NF at MEC-N 126 is a VNF, initialization of the VNF may include establishing/instantiating and configuring the VNF. The MM/SM 120 also includes a UE location and round-trip time (RTT) tracker 122 for tracking a location of the UE 100 relative to its connected AP 110 or anchor point, and tracking the round-trip time (i.e. latency) for communications between the MEC-N and the UE 100. The MM/SM 102 is in communication with a node within the Radio Access Network (RAN) 108 to obtain the location/RTT information for UE 100 connected to the RAN 108. The MM/SM 120 manages establishing connections to the NF by transmitting path configuration instruction to the MEC-N 125. Depending upon the network architecture, the MM/SM 120 may further communicate with a MEC management and network operations (MANO) entity 217 to access the MEC orchestrator 218, MEC VNF manager (VNFM) in the case when the NF is virtualized, and virtualized infrastructure manager (VIM) 222 to instantiate the VNF on the MEC-N 125. As illustrated, the MEC VNFM 219 may include a lifecycle management entity and a fault, charging, accounting, performance, security (FCAPS) management entity 221 to assist with virtualization. In an aspect, the MM/SM 120 may contact the MEC MANO 217 via an operational support system (OSS) 216, or a proxy thereof, that supports the MEC-N 125.

In an embodiment, the MEC-N 125 consists of resources supplied by an edge server available on the network 105. The edge server may be located, for instance at or near an AP 110, a regional data center, a domain data center, a central data center, or some other location as may be convenient within a given network architecture. To support the MEC-N 125, sufficient resources of the edge server are provided including processing, memory, storage, IO, and applications as necessary. These resources may be provided through allocation of portions of a dedicated NF, or through the allocation of sufficient resources to allow for the virtualization of a sufficiently robust VNF 133. The support may include, for instance, a data-store (e.g. a database) managed by the edge server. In other aspects, the MEC-N 125 may be responsible for its own data-store. The MEC-N 125 provides sufficient resources to enable it to perform the computational task(s) requested by the UE 100. For instance, the MEC-N 125 may include network functions virtualization infrastructure (NFVI) hardware 131, or access to such hardware as provided by the edge server. The resources may also include a host operating system (Host OS) 132 for executing the NF, and the functionality to create a VNF 133 container for holding the application, binaries/libraries 134, and data used in executing the NF. In an aspect, the container may also include user plane applications (UP App) 135 and control plane applications (CP App) 138 required to initialize the NF for that UE 100. In an aspect, the UP App 135 and the CP App 138 may be external from the container. The MEC-N 125 may also include a Quality of Service (QoS) element 139 to interface with the MEC VNFM and the MM/SM 120 to provide a required level of QoS. As indicated above, the MEC-N 125 may include, or have access to, a data-store for storing data related to the computational task. In relation to the MEC session request, the MEC-N 125 is operative to store state data related to the MEC session in a state data-store 137 (e.g. a state database).

Figure 3B:
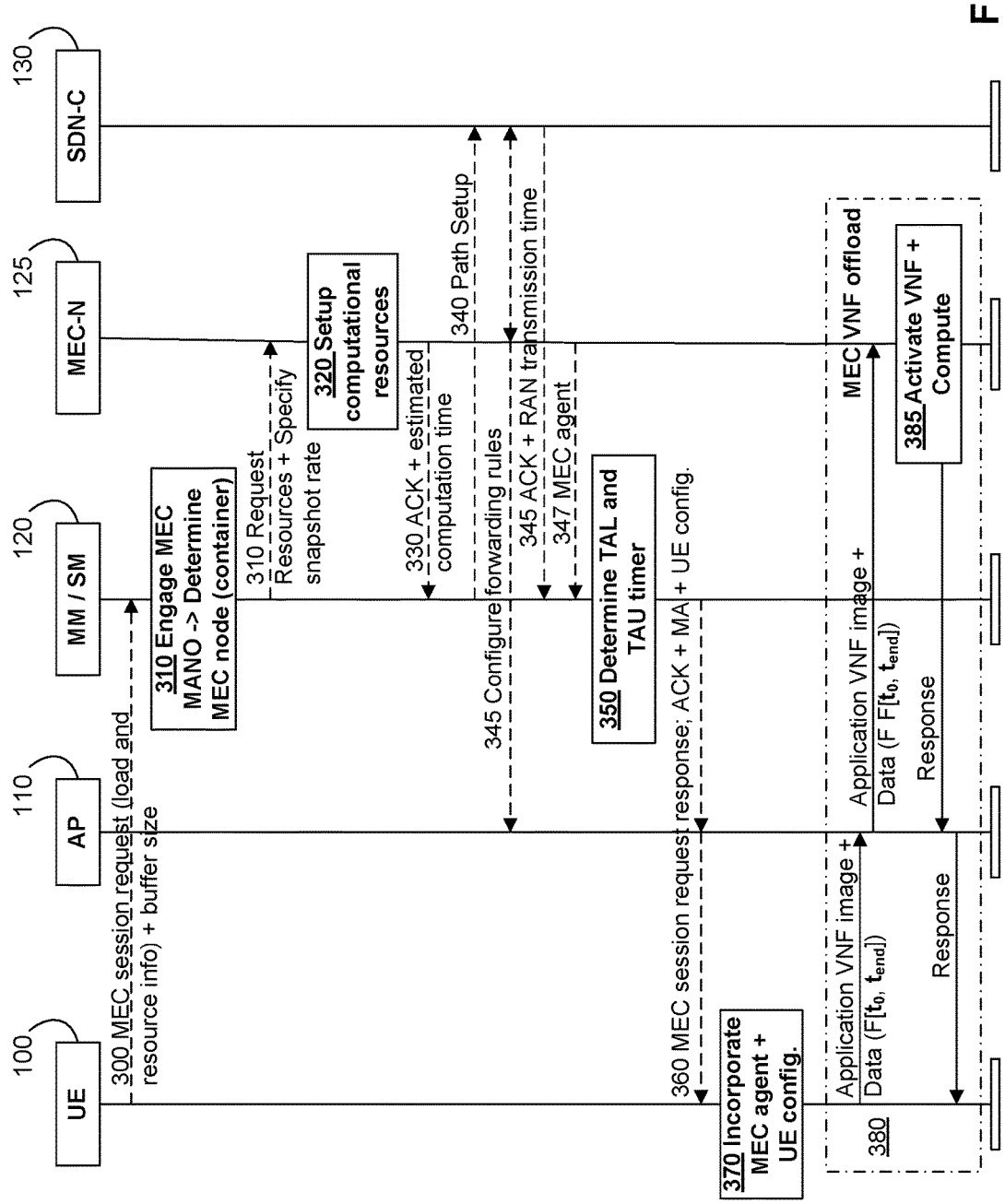

FIG. 3b is a signalling diagram illustrating an embodiment of operations to enable the UE 100 to offload the computational task to the MEC-N 125, based on the system architecture of FIG. 3a. Steps 300 to 370 correspond to the control signalling indicated in FIG. 2c. Steps 380 to 385 generally correspond to the remainder of the signalling in FIG. 2c.

In step 300 the UE 100 transmits a MEC session request to the MM/SM 120. In an aspect, the MEC session request may include, for instance the estimated work load, required resources, and buffer size for the computational size. The MM/SM 120 receives the MEC session request, and in step 310 the MM/SM 120 transmits a request for resources to the MEC-N 125 to initiate the allocation of resources to setup a NF corresponding to the MEC session request. The request for resources may include a specified NF state snapshot rate to define the process snapshot rate by the MEC-N 125. Depending upon the network implementation, and referring to FIG. 3a, the step 310 request for resources engages the MEC MANO which determines and instructs the MEC-N 125 to allocate a NF resources corresponding to the MEC session request. The engagement with the MEC MANO may be achieved, for instance, through an OSS, or may be achieved through another network entity, depending upon the network implementation. The MEC MANO may assist MM/SM 120 in selecting a particular MEC-N 125 based upon network conditions, and to choose a MEC-N 125 that is both available to host the NF and satisfy the RTT requirement of that computational task. In response to receiving the request for resources, in step 320 The MEC-N 125 evaluates the request for resources and sets up the required computational resources to support the NF. As described above, the computational resources may include, for instance, memory, storage, and processing allocations. In an aspect, the MEC-N 125 may further provide a MEC agent that maintains the MEC-N context and—customizes the uplink data transmissions from the UE 100 in a data structure or format that facilitates interfacing with the MEC-N. In step 330, the MEC-N 125 returns an acknowledgement of the request for resources to the MM/SS 120. In an aspect, the MEC-N 125 may include an estimated computation time for the computational task. In step 340 the MM/SM 120 transmits a path setup request to the SDN-C 130. In response to receiving the path setup request, in step 345 the SDN-C 130 establishes the UP path between the MEC-N 125 and the AP 110 attached to the UE 100 by configuring and transmitting path forwarding rules to the MEC-N 125 and the AP 110. To complete step 345, the SDN-C 130 may further transmit a path setup request response to the MM/SM 120 confirming the path configuration, and an estimated latency or transmission time between the UE 100 and the MEC-N 125 through the RAN. In optional step 347 where a MEC agent is to be used, the MEC-N 125 transmits the MEC agent corresponding to the MEC session request to the MM/SM 120.

In step 350 the MM/SM 120 determines a tracking area list (TAL) that lists APs 110 that are proximate to the UE's 100 current location, as well as a tracking area update (TAU) periodic timer based on the received estimations for the computation time and the transmission time. In step 360 the MM/SM 120 transmits a MEC session request response which identifies the MEC-N 125 assigned to the MEC session request. The response may include a MEC session establishment acknowledgement, the TAL, the TAU, and any additional UE configuration information required to complete the UE configuration In step 370 the UE 100 evaluates the UE configuration information, and optional MEC agent information, and incorporates them into its future NF operations. In an aspect, the UE 100 may use the UE configuration information to set a format (i.e. periodicity, size of time segment, size of data segment, etc.) of the data uplink. In an aspect, the UE 100 may use the UE configuration information to set a format for the NF state data to be received by the MEC-N 125. In step 380 the UE 100 transmits the NF in the form of an application image, along with associated information such as binaries, libraries and data to the MEC-N 125, via the AP 110, for instantiation. The data may be in the form of a single data uplink as described above, or may be in the form of a data flow (data $F[t_0, t_{end}]$) with an initial data segment, and then subsequent data segments transmitted to the MEC-N 125 (either periodically in pre-determined data segments, or as needed by the UE 100). In step 385 the MEC-N 125 activates the NF and carries out the instructed computations using the uplinked data to perform the computational task. In the case of a data flow, the MEC-N 125 may incorporate the subsequent data uplinks as received into the NF operations. As the computational task progresses, the MEC-N 125 transmits at least one interim response in the form of updated NF state data indicating an interim state of the NF to the UE-100 in the downlink path. With completion of the computational task, the MEC-N 125 transmits a final response incorporating the final result of the NF computational task. In some aspects, the completion of the computational task may be triggered when the MEC-N 125 receives a task completion trigger. In some aspects, the task completion trigger may be transmitted by the MM/SM 120 to the MEC-N 125 in response to the UE-100 moving out of the coverage area of AP 110. In some aspects, the task completion trigger may be transmitted by the UE 100 to the MEC-N 125.

Figure 4A:
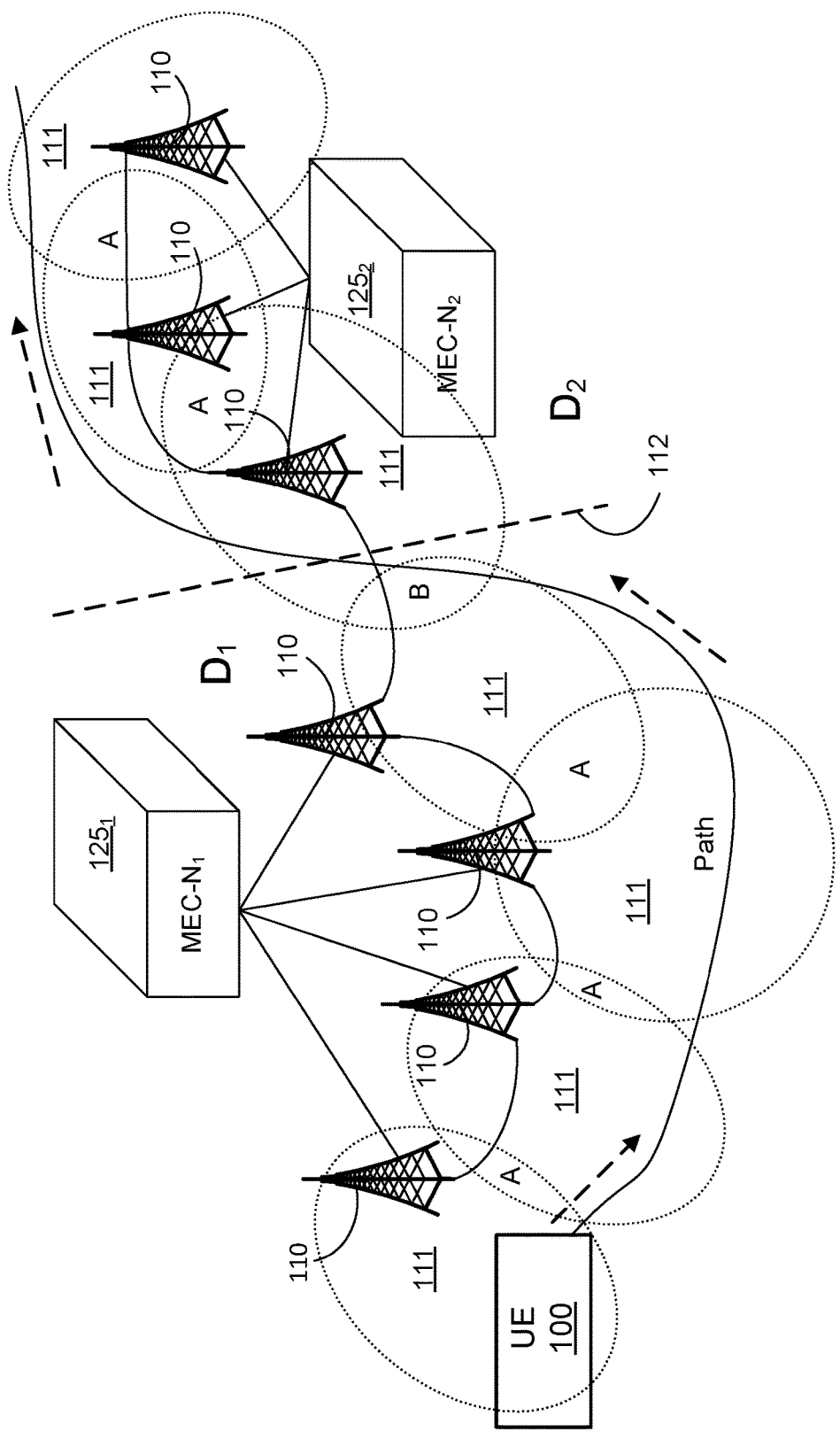
FIG. 4a is an illustration of a mobile network.

Referring to FIG. 4a, in this implementation, when UE 100 is starts along the identified path, a computational task is undertaken by a NF at MEC-N$_1$ 125$_1$ and transitions along the outlined path. The computational task may be offloaded by the UE 100, or may be assigned by another element.

While the UE 100 traverses through MEC group 1 D$_1$, it passes through successive coverage areas 111 of APs 110. In the intra MEC group transition areas A, the UE 100 transitions connection from a current AP 110 to a new AP 110 to provide coverage in the next coverage area 111. While in MEC group 1 D$_1$, the MEC-N$_1$ 125$_1$ is operative to continue processing the NF regardless of the location of the UE 100. In the intra MEC group transition areas A, the UE 100 engages a conventional hand-off procedure with MM/SM 120 to be authorized with, and connect to, the next AP 110. In an aspect, the MM/SM 120 may be operative to communicate the hand-off to the MEC-N$_1$ 125$_1$ and provide an updated UP path to the MEC-N$_1$ 125$_1$. In an aspect, the UE 100 may initiate the UP update by transmitting a UP update request to the MM/SM 120 to trigger the communication of the hand-off and the UP update to the MEC-N$_1$ 125$_1$. In either case, the UP update is communicated to the MEC-N$_1$ 125$_1$ to enable the MEC-N$_1$ 125$_1$ to transmit state data and/or the result of the computational task to the UE 100 as necessary regardless of the which current AP 110 within MEC group D$_1$ is serving the UE 100.

When the UE 100 transitions between MEC groups, i.e. between MEC group D$_1$ and MEC group D$_2$, in inter-MEC group transition area B, the UE 100 engages a conventional inter-MEC group hand-off procedure with MM/SM 120 to be authorized with, and connect to, the next AP 110. In some aspects, the inter-MEC group handoff procedure may further pass the UE 100 on to a new MM/SM 120 responsible for the new MEC group D$_2$. In some aspects, the inter-MEC group transition may arise by a re-arrangement in the network topology, in which case the current AP 110 is assigned to a new MEC-N$_2$ 125$_2$ In either case, the inter-MEC group transition includes a hand-off from the current first MEC-N$_1$ 125$_1$ to a new second MEC-N$_1$ 125$_1$. Similarly, for UE 100 that are transitioning between networks, a new MEC-N$_n$ 125$_n$ may be assigned in the new network.

Figure 4B:
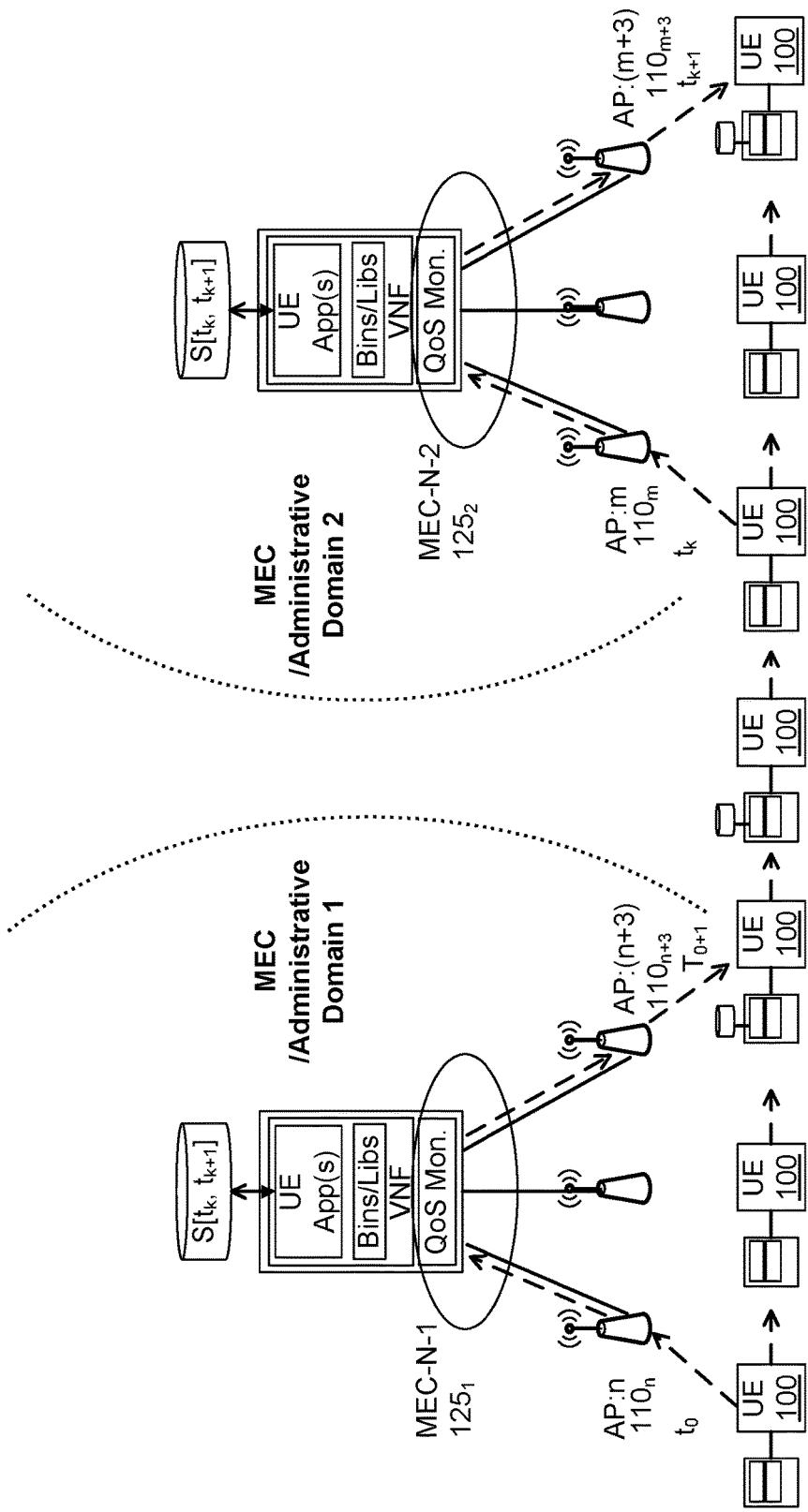
FIG. 4b is a block diagram illustrating an embodiment of an inter-MEC group transition.

In FIG. 4b the UE 100 is illustrated in an inter-MEC group transition between MEC/Administrative group 1 and MEC/Administrative group 2. As described above, a UE 100 offloads a computational task in the form of a NF onto the MEC-N$_1$ 125$_1$. Once the task has been offloaded, the UE 100 may traverse through the coverage areas of multiple APs 110 within MEC/Administrative MEC group 1 without affecting processing of the computational task by the MEC-N$_1$ 125$_1$. During that period, the UE 100 may or may not be continuously attached to one or more AP 110 serving the MEC/Administrative group 1. The MEC-N$_1$ 125$_1$ forwarding to the UE 100 NF state updates and/or a final result of the computational task. As the UE 100 reaches the transition point B between MEC groups, the UE 100 receives a final NF state update from the MEC-N$_1$ 125$_1$ at time t$_1$. The UE 100 then engages in the hand-off procedure with the MM/SM 120 to be connected with the new MEC-N$_2$ 125$_2$ at time t$_k$. As indicated above, in some aspects the UE 100 may continue the computational task from the final NF state update between time t$_1$ and time t$_k$. In these aspects, the state at time t$_k$ will include the additional processing performed by the UE 100, and accordingly the state at time t$_k$ will differ from the state at time t$_1$, as reported by the MEC-N$_1$ 125$_1$. As illustrated in the example of FIG. 4b, the MEC-N$_2$ 125$_2$ reports the final computational result, and corresponding final state of the NF, to the UE 100 at time t$_{k+1}$.

Figure 4C:
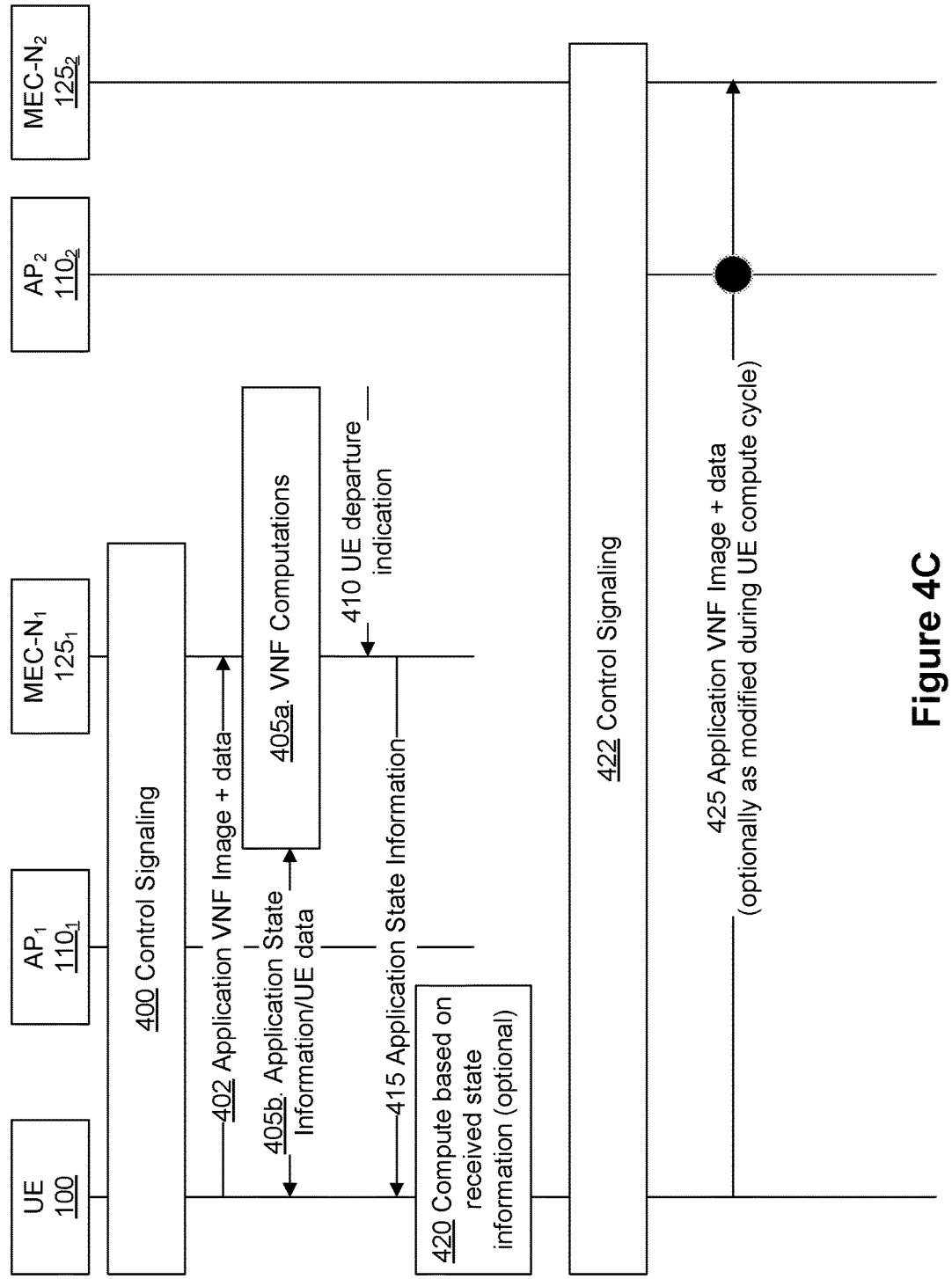
FIG. 4c is a signalling diagram illustrating an example of NF transition between MEC nodes.

Referring to FIG. 4c, a signalling diagram is presented illustrating an example of NF transition between MEC nodes MEC-N$_1$ 125$_1$ and MEC-N$_2$ 125$_2$. In step 400 Control signalling is exchanged between the UE 100, AP$_1$ 110, and MEC-N$_1$ 125$_1$ to prepare the MEC-N$_1$ 125$_1$ to receive the NF image. An example of more detailed control signalling steps is provided, for instance, in FIG. 3b described in more detail above. In step 402 The UE 100 transmits the application NF image and associated data to the MEC-N$_1$ 125$_1$. In step 405a. the MEC-N$_1$ 125$_1$ instantiates the NF image and carries out the computations. In step 405b. the MEC-N$_1$ 125$_1$ may periodically transmit interim NF state data before step 415. In some aspects, the UE departure notification may arrive before the first scheduled NF state data transmission, in which case the interim step 405b. will not occur. In an aspect, the MEC-N$_1$ 125$_1$ may also receive interim data updates from the UE 100, as described above. In step 410 the MEC-N$_1$ 125$_1$ receives a UE departure indication which indicates that the UE 100 is about to depart the MEC group of the MEC-N$_1$ 125$_1$. In response to receiving the UE departure indication, the MEC-N$_1$ 125$_1$ concludes its computations on the NF and in step 415 transmits to the UE 100 a UE departure response including final state data corresponding to the termination point of the computations triggered by the receipt of the UE departure information. The UE 100 receives the final state data. In an aspect, the final state data may include a computational result produced by the computations to the termination point. In an aspect, the final state data may include state data corresponding to a state of the computational task at the termination point. In optional step 420 the UE 100 may continue the computations from the termination point using the received final application state data. Alternatively, the UE 100 may retain the final NF state. In step 422 the UE 100 has elected to offload the computational task in its current state to a new MEC-N$_2$ 125$_2$. Control signalling, similar to that described above in step 400 and FIG. 3b may be exchanged with the AP$_2$ 110, and MEC-N$_2$ 125$_2$ to prepare the MEC-N$_2$ 125$_2$ to receive the NF image in its current state. The current state may be the same as the final NF state received from the MEC-N$_1$ 125$_1$, or may be the state after some interim processing by the UE 100 before the new offload to the MEC-N$_2$ 125$_2$. Finally, in step 425 the UE 100 transmits the application NF image and associated data to the MEC-N$_2$ 125$_2$ in the current state. In an aspect, the current state may be indicated by transmitting state data corresponding to the current state to the MEC-N$_2$ 125$_2$. In an aspect, the current state may be indicated by the UE 100 preparing a current application NF image that corresponds to the current state. In an aspect, the current state may be indicated by the associated data transmitted to the MEC-N$_2$ 125$_2$.

Figure 5A:
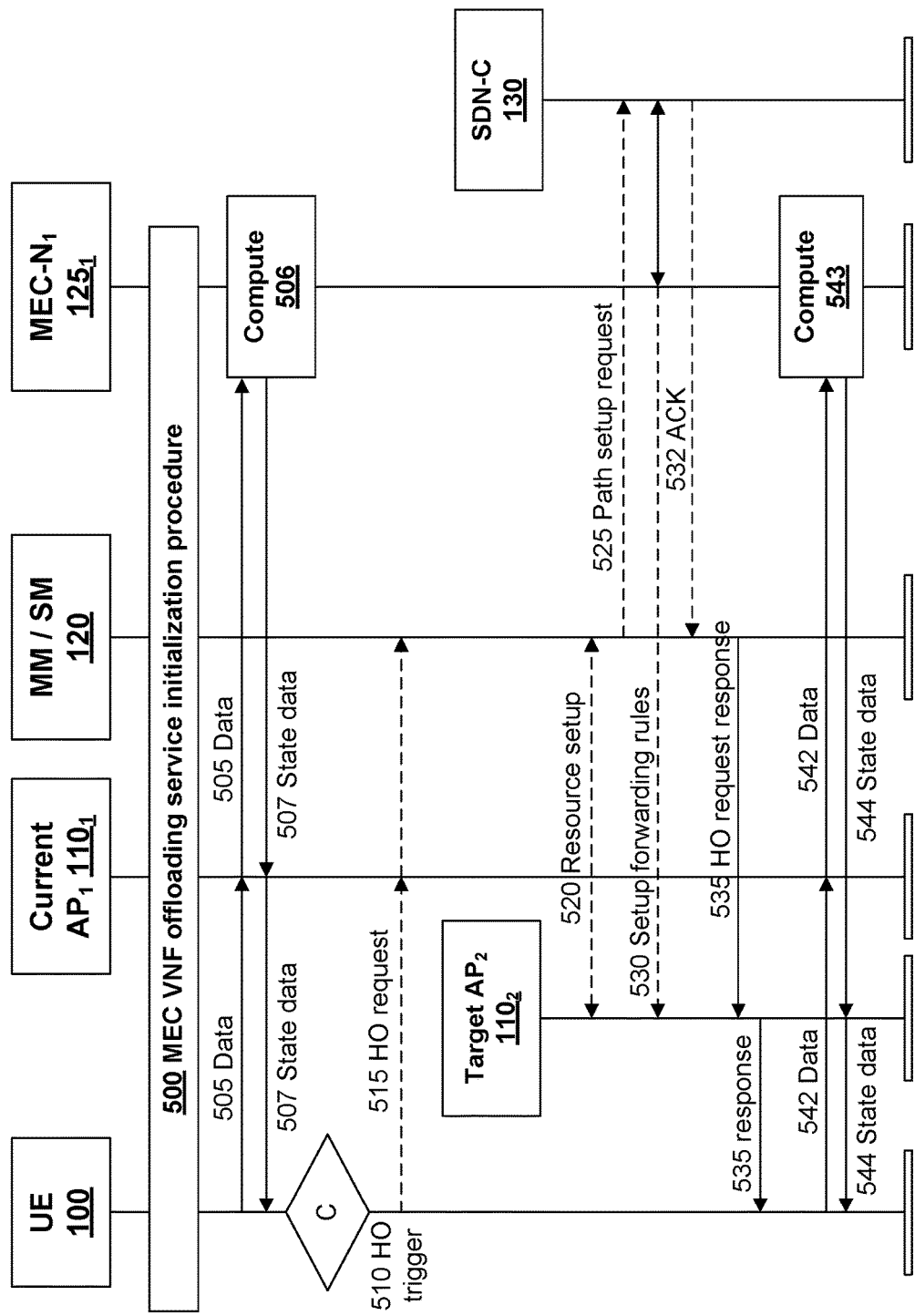
FIGS. 5a and 5b are signalling diagrams which illustrate embodiments of a hand-off procedure for an intra MEC group transition and an inter-MEC group transition, respectively.
Figure 5B:
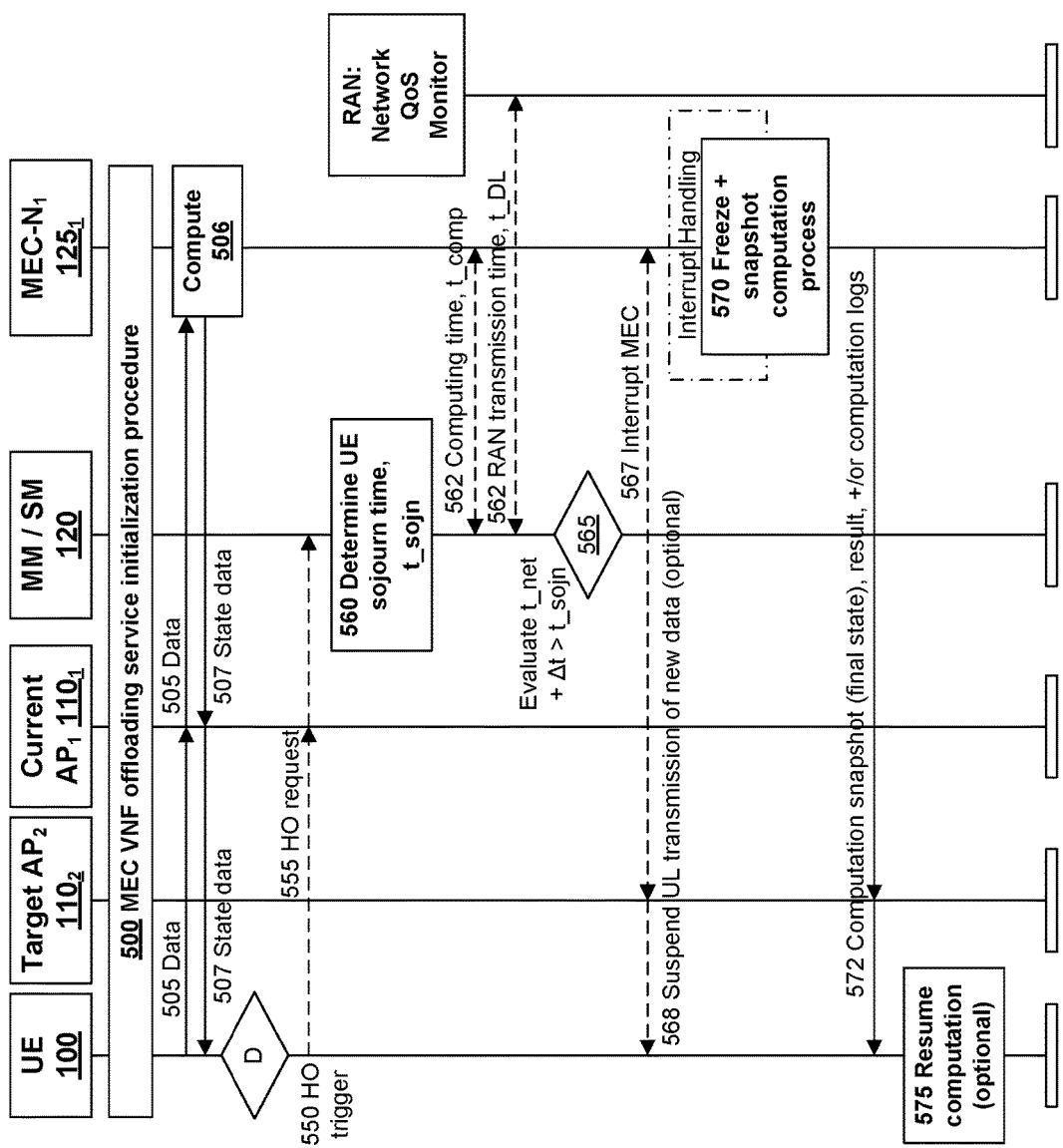

FIGS. 5a and 5b are signalling diagrams which illustrate embodiments of a hand-off procedure for an intra MEC group transition and an inter-MEC group transition, respectively. As also indicated above, there are two main implementations for a hand-off. In the first implementation, the UE 100 contacts a current AP$_1$ 110$_1$ to request a hand-off to a new target AP$_2$ 110$_2$. In the second implementation, the UE 100 may have already lost its connection to the current AP 110, and the hand-off request may be submitted directly to the new AP 110 within a current coverage area. FIG. 5a is illustrative of the first implementation, and FIG. 5b is illustrative of the second implementation. However, either implementation may be used for both the intra MEC group and the inter-MEC group transitions depending upon the circumstances. In an aspect, a system and method may be provided wherein a UE 100 may request a hand-off of a NF function by either transmitting a hand-off request to a current AP$_1$ 100$_1$ for receipt by the MEC-N$_1$ 125$_1$ or by transmitting the hand-off request to a new target AP$_2$ 100$_2$ for receipt by the MEC-N$_1$ 125$_1$. The aspect allows the UE 100 to request the hand-off either before or after it leaves the coverage area served by the AP$_1$ 100$_1$, regardless of whether the transition to the new target AP$_2$ 100$_2$ is an intra MEC group transition or an inter-MEC group transition.

FIG. 5a illustrates an embodiment of an intra MEC group transition wherein the UE 100 is transitioning to leave the service area of a first current AP$_1$ 110$_1$ but remains within the MEC group served by the MEC-N$_1$ 125$_1$. In an aspect, the UE 100 may be transitioning to the coverage of a second target AP$_2$ 110$_2$, as described above in relation to FIG. 4a in intra MEC group transition zones A.

As illustrated, in step 500 the UE 100 has already offloaded the NF onto the MEC-N$_1$ 125$_1$ as described above. In this example, in step 505 the UE 100 is uplinking data, such as data segments of flow data, to the MEC-N$_1$ 125$_1$. In step 506 the MEC-N$_1$ 125$_1$ incorporates the uplinked data segments in its NF computations. In step 507 the MEC-N$_1$ 125$_1$ transmits interim state data to the UE to update the UE 100 with the current state of the NF computations. The data uplink step 505, computation step 506, and state data downlink step 507 may be repeated multiple times, though only one cycle is illustrated in FIG. 5a for clarity.

The intra MEC group transition steps begin at event C when, in step 510, a hand-off trigger is identified by the UE 100. The hand-off trigger may be based upon a location of the UE 100, a new coverage area being identified, or based upon an outside trigger received from the network 105. After the hand-off-trigger, in step 515 the UE 100 transmits a hand-off (HO) request to the AP$_1$ 110$_1$ to forward to the MM/SM 120. In step 520 the MM/SM 120 identifies a new target AP$_2$ 110$_2$, and exchanges resource setup information with the AP$_2$ 100$_2$ based on the received HO request. In step 525 the MM/SM 120 transmits a path setup request to the SDN-C 130. After receiving the path setup request, in step 530 the SDN-C 130 transmits setup information to the target AP$_2$ 110$_2$ and the MEC-N$_1$ 125$_1$ to establish the forwarding rules and configure the UP path. After configuring the UP path in step 532 the SDN-C 130 transmits a path setup acknowledgement to the MM/SM 130. In step 535, after configuration of the UP path, the MM/SM 120$_1$ transmits a HO request response to the UE 100 via the new target AP$_2$ 110$_2$. In this implementation the HO request response may include any path information required for the UE 100 to communicate with the MEC-N$_1$ 125$_1$. After the HO request response has been received by the UE 100, in step 542 the UE 100 is able to transmit flow data to the MEC-N$_1$ 125$_1$, which the MEC-N$_1$ 125$_1$ may use in continuing the NF computations in step 543. In step 544 the MEC-N$_1$ 125$_1$ transmits state data to the UE 100.

FIG. 5b illustrates an embodiment of an inter-MEC group transition wherein the UE 100 is transitioning to leave the service area of a first current AP$_1$ 110$_1$ and leave the MEC group served by the MEC-N$_1$ 125$_1$. In an aspect, the UE 100 may be transitioning to the coverage of a second target AP$_2$ 110$_2$, as described above in relation to FIG. 4a in inter-MEC group transition zones B. As will be appreciated, the SDN-C may be operative to facilitate the inter MEC group hand-off, as described above in relation to FIG. 5a.

As illustrated, the UE 100 has already offloaded the NF onto the MEC-N$_1$ 125$_1$ in step 500 as described above. In this example, the data uplink step 505, computation step 506, and state data downlink step 507 are the same procedures as described above in reference to FIG. 5a.

The inter-MEC group transition steps begin at event C when, in step 550, a hand-off trigger is identified by the UE 100. The hand-off trigger may be based upon a location of the UE 100, a new coverage area being identified, or based upon an outside trigger received from the network 105. After the hand-off-trigger, in step 555 the UE 100 transmits a hand-off (HO) request to the AP$_1$ 110$_1$ to forward to the current MM/SM 120. In step 560 the MM/SM 120 identifies a new target AP$_2$ 110$_2$, and determines the sojourn time t_sojn of the UE 100 within the current MEC group. If necessary, in step 562 the MM/SM 120 may further query the MEC-N$_1$ 125$_1$ for an estimate of the remaining computing time to complete the computational task t_comp, and/or may query the network QoS monitor for an estimate of the downlink transmission time through the radio access network (RAN) t_DL. In step 565 the MM/SM 120 may determine whether to interrupt the MEC-N$_1$ 125$_1$ operations by evaluating the obtained t_comp, t_DL and t_sojn.

In an aspect, the MM/SM 120 may perform the evaluation by comparing the sum of the computation time and the downlink transmission time (t_comp+t_DL=t_net) with the sojourn time (t_sojn) to determine if enough time remains to complete the computation and report the result before the UE 100 leaves the MEC group. If the sum is greater than a pre-determined threshold value (i.e. t_net+Δt>t_sojn, where Δt is an estimate of the error in the three time values) then there is likely not enough time to complete the computational task before the UE 100 leaves the MEC group.

In response to determining that the UE 100 will likely leave the MEC group before the computational task is completed, in step 567 the MM/SM 120 transmits a calculation interrupt command to the MEC-N$_1$ 125$_1$. In optional step 568 the MM/SM 120 transmits a suspension command to the UE 100, instructing the UE 100 to suspend uplink transmissions of new data to the MEC-N$_1$ 125$_1$. In step 570 the MEC-N$_1$ 125$_1$ implements its interrupt handling to freeze the computational task in its current state, take a snapshot of the NF in its current state, and collect any related data or results to that point. In step 572 the MEC-N$_1$ 125$_1$ transmits to the UE 100 the current state data, the NF snapshot, and any related information including data, results, and/or computational logs. In optional step 575 the UE 100 may resume computations based upon the received current state data, -NF snapshot, and related information. Alternatively, the UE 100 may transmit a MEC session request to a new target MEC-N$_2$ 125$_2$ based on the received current state data, NF snapshot and related information.

Figure 6:
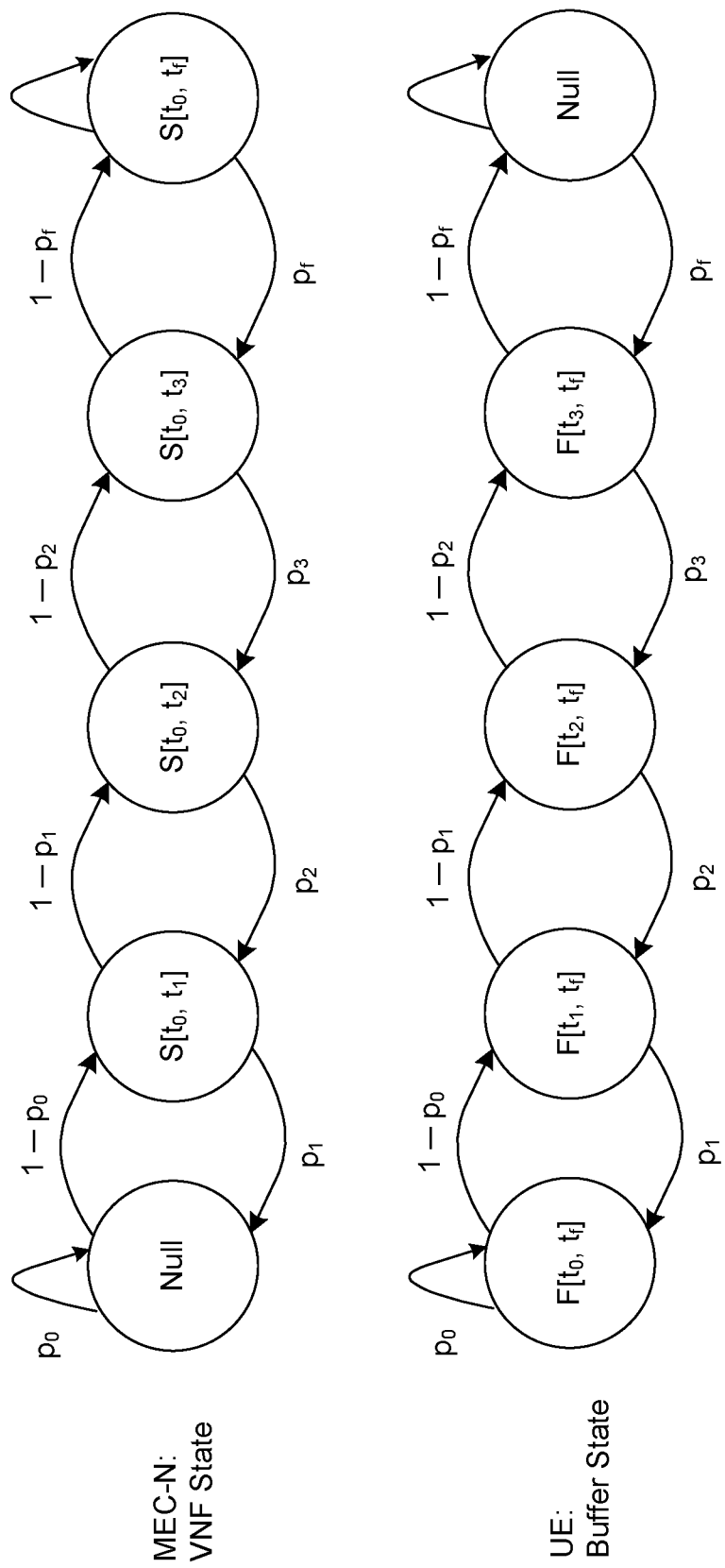
FIG. 6 is a block diagram illustrating an embodiment of NF state management.

FIG. 6 is a block diagram illustrating the NF state management at the MEC-N 125. The upper row indicates the changing MEC-N 125 NF state at each time step. The lower row indicates the buffer state of the UE 100 including flow data to be uploaded to the MEC-N 125 at each time step. By having a state synchronization policy, driven by time intervals or through the detection of events, the synchronization of the states at the two nodes can be maintained.

Figure 7A:
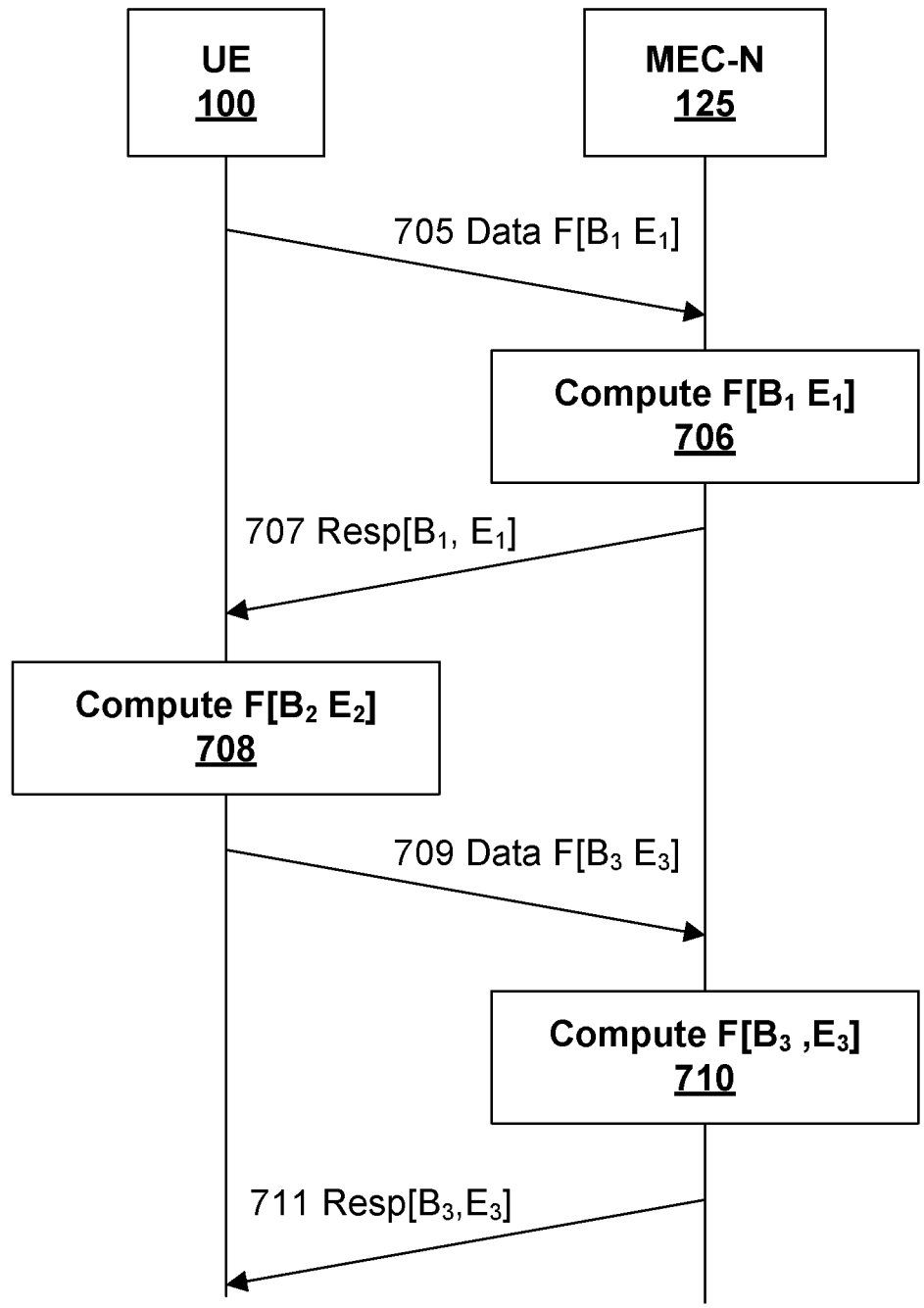
FIGS. 7a and 7b provide examples of an embodiment of synchronous computing between the UE and the MEC-N.
Figure 7B:
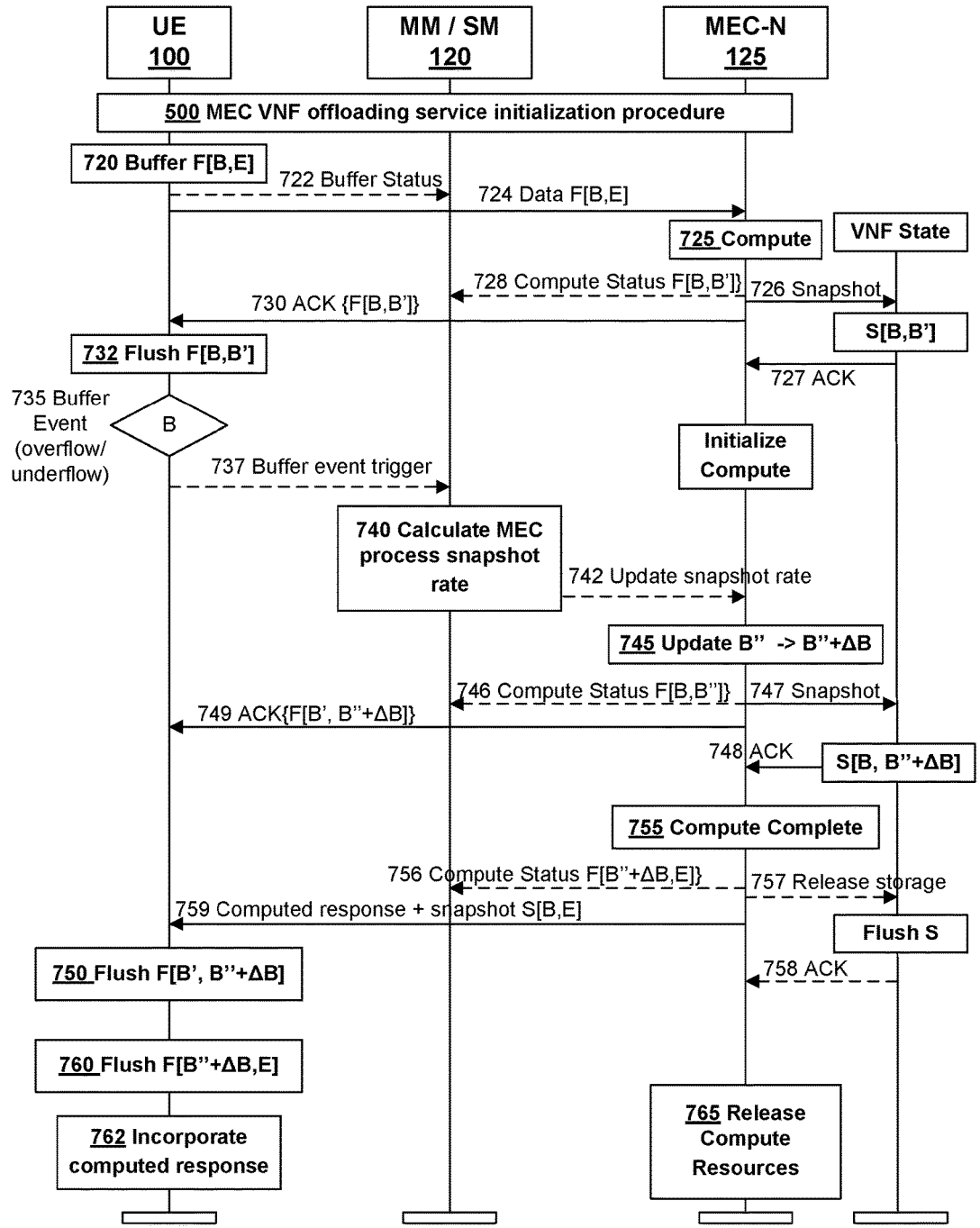
Figure 8A:
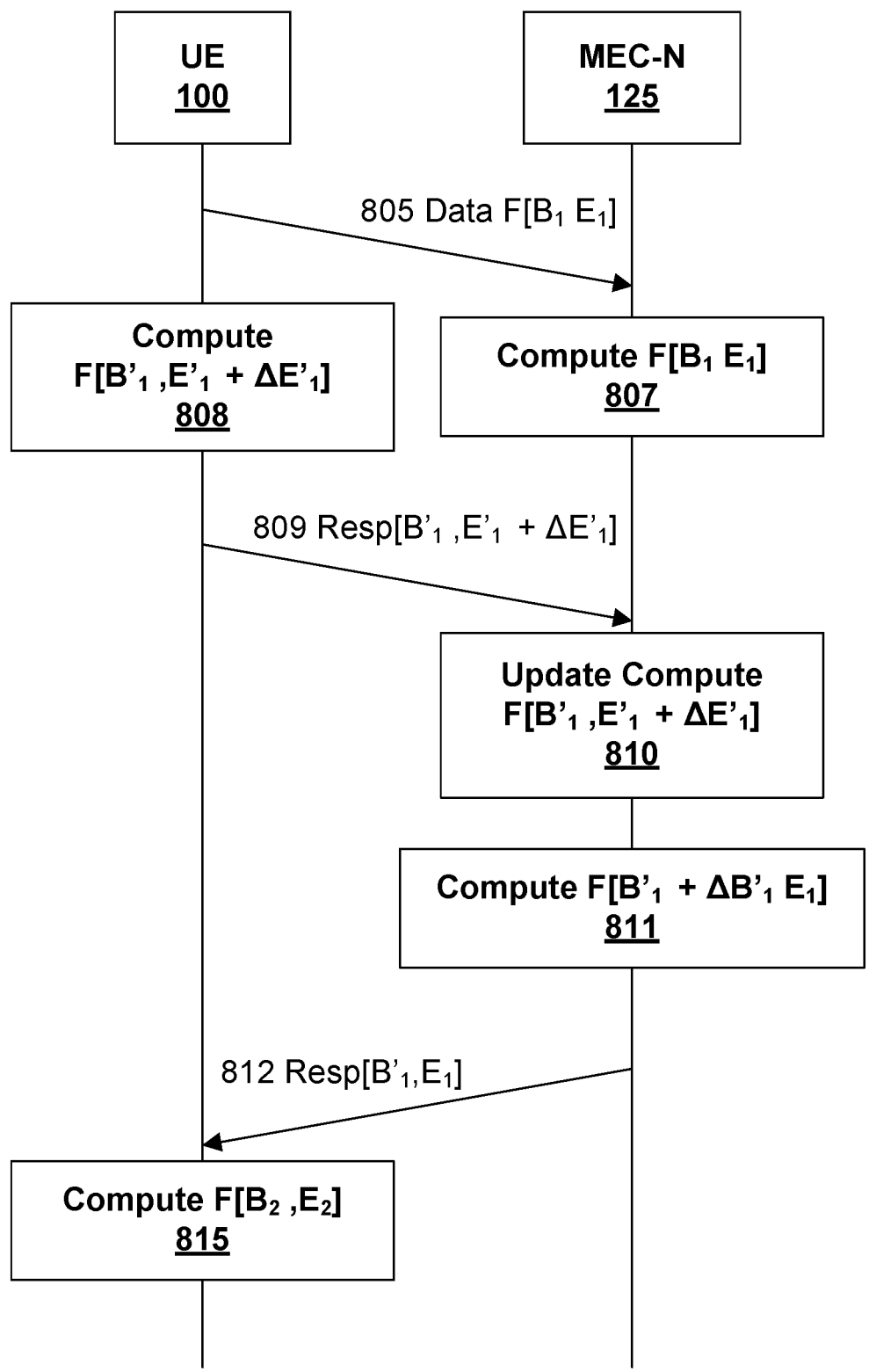
FIGS. 8a and 8b provide examples of an embodiment of synchronous computing between the UE and the MEC-N.
Figure 8B:
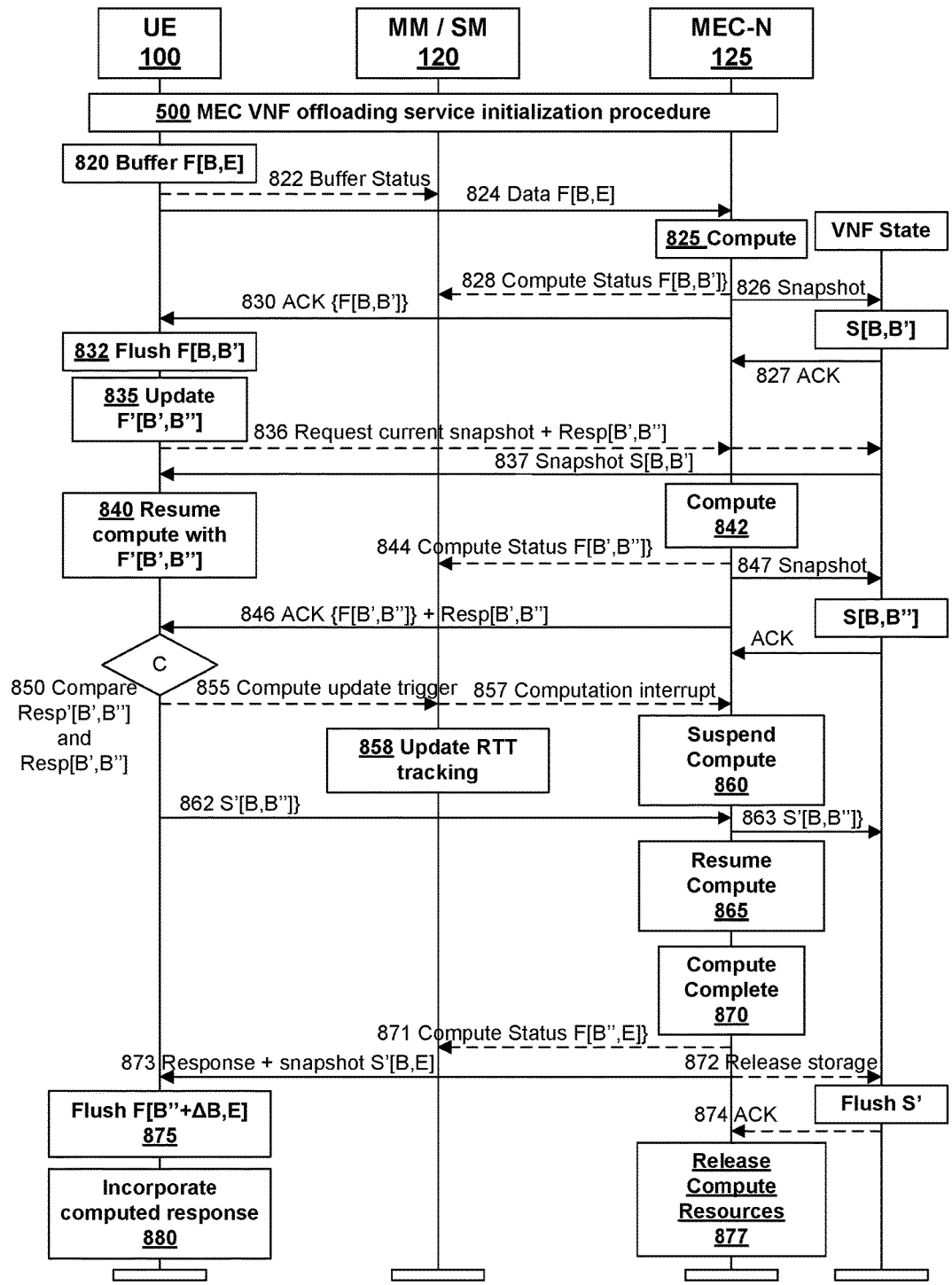

FIGS. 7a and 7b provide examples of synchronous computing between the UE 100 and the MEC-N 125. FIGS. 8a and 8b provide examples of asynchronous computing performed by the UE 100 and the MEC-N 125.

Referring to FIG. 7a, a signalling diagram illustrates an embodiment of a simplified exchange of data between a UE 100 and a MEC-N 125 for a synchronous computing application. In the synchronous computing application, the UE 100 and the MEC-N 125 exchange data sequentially after each entity performs its computational or data collection task. In the example of FIG. 7a, the UE 100 is transmitting data flow in the form of data segments. The data segments may correspond to data collected by the UE 100, or may be the result of a computation performed by the UE 100 based upon collected data and/or the previous response provided by the MEC-N 125. In an aspect, the data may be collected by the UE 100 after taking some action directed by the previous response provided by the MEC-N 125. In an aspect, the responses provided by the MEC-N 125 may comprise interim results based upon the previous data segment transmitted by the UE 100. The signalling diagram starts with the UE 100 transmitting a first data segment from the data flow to the MEC-N 125 in step 705. In step 706 the MEC-N 125 receives the first data segment and incorporates it in the NF computations. In step 707 the MEC-N 125 transmits a response to the UE 100 in the form of an interim result and/or state data. In the embodiment of FIG. 7a, in step 708 the UE 100 incorporates the response into UE computations performed at the UE 100. In step 709 the UE 100 transmits a second data segment to the MEC-N 125 based upon the UE computations. In step 710 the MEC-N 125 receives the second data segment and incorporates it in the NF computations. In step 711 the MEC-N 125 transmits a second response to the UE 100 in the form of a second interim result and/or state data. The sequence of operations illustrated in FIG. 7a may continue until a final result is determined, or until the UE 100 chooses to stop the synchronous computing operation.

For example, in an autonomous vehicle/robot application, the UE 100 may be transmitting data updates, and may be receiving navigation or pattern recognition information in the form of responses sent by the MEC-N 125. The UE 100 may be taking navigational action based upon the responses, and accordingly the data updates reflect new information that results after taking action based upon the previous response.

FIG. 7b is a detailed signalling diagram illustrating an embodiment of the signalling between the UE 100, MM/SM 120 and MEC-N 125 in an example of a synchronous computing application. The signalling diagram begins after step 500 in which the NF has been offloaded onto the MEC-N 125, as described above. In step 720 the UE 100 buffers the data flow F[B, E]. In step 722 the UE 100 transmits the buffer status to the MM/SM 120. The buffer status may be used by the MM/SM 120 to adjust the snapshot rate at the MEC-N 125 and/or the buffer rate at the UE 100. In step 724 the UE 100 transmits the buffered data segment F[B, E] to the MEC-N 125. The buffered data segment F[B, E] may more generally be referred to as a data update sent by the UE 100. In step 725 the MEC-N 125 performs computations using the data update. As described in more detail above, the MEC-N 125 performs periodic NF snapshots and transmits current state data to the UE 100. In the example of FIG. 7b, in step 726 the MEC-N 125 transmits a current snapshot of the NF along with accompanying state data to the NF state data-store. The NF state datastore is updated with the current snapshot in step 727, and may return an acknowledgement of the NF state update to the MEC-N 125. In step 728 the MEC-N 125 transmits a compute status update to the MM/SM 120. The MM/SM 120 may use the compute status update to evaluate and, if necessary, calibrate and adjust the snapshot rate at the MEC-N 125 and/or the buffering rate at the UE 100. In step 730 the MEC-N 125 transmits a data update acknowledgement to the UE 100. In an aspect, the acknowledgement may include updated state data corresponding to the snapshot and compute status update. In an aspect, periodic acknowledgements may include the updated state data. In an aspect, every acknowledgement may include the updated state data. In optional step 732, the UE 100 may flush, or partially flush, the buffer based upon the received data update acknowledgement. In an aspect, the UE 100 may further update a local state datastore based upon received state data included with the data update acknowledgement.

In the event that the computations between the UE 100 and the MEC-N 125 become de-synchronised, in step 735 the UE 100 may experience a buffer event B. The buffer event B may be due to an overflow or an underflow of data into the buffer, in cases where the MEC-N 125 lags or proceeds ahead of the UE 100 in processing its respective data set. The embodiment of FIG. 7b includes buffer event handling to mitigate the buffer event. In step 737, when a buffer event occurs the UE 100 transmits a buffer event trigger to the MM/SM 120. The buffer event trigger indicating whether the buffer event is an underflow or an overflow condition. In an aspect, the buffer event trigger further includes buffer event information which provides a quantitative measure of the buffer event. In step 740, in response to receiving the buffer event trigger, the MM/SM 120 evaluates the current MEC snapshot rate, and compares it with the buffer event trigger, to determine wither the snapshot rate should be updated. In the event the snapshot rate should be updated, in step 742 the MM/SM 120 transmits a snapshot rate update request to the MEC-N 125. In response to receiving the snapshot rate update request, in step 745 the MEC-N 125 updates the snapshot rate and continues with the computations using the new snapshot rate to update the NF state data-store (step 747), transmit the compute status (step 746) to the MM/SM 120, and transmit the data update acknowledgements to the UE 100 (step 749) as described above, until completion of the computational task (or receipt of a MEC interrupt if relevant). Upon completion of the computational task in step 755, in step 756 the MEC-N 125 transmits the final compute status to the MM/SM 120. In step 759 the MEC-N 125 transmits the final result, data, and NF snapshot to the UE 100. In step 757 the MEC-N 125 releases the NF state storage and may receive an acknowledgement that the NF state datastore has been released/flushed in step 758. In step 765 the MEC-N 125 releases the computing resources held for that NF. As indicated, the UE 100 may flush its buffer in step 760 and incorporate or act on the final computed response in step 762.

Referring to FIG. 8a, a signalling diagram illustrates an embodiment of a simplified exchange of data between a UE 100 and a MEC-N 125 for an asynchronous computing application. In the asynchronous computing application, the UE 100 and the MEC-N 125 perform computations in parallel and exchange data in a non-sequential fashion. In some cases, one requesting entity, such as UE 100, will provide a single workload to a computing entity, such as MEC-N 125, and will perform other tasks without transmitting additional data or results to the computing entity. In other cases, the requesting entity will provide updated data or results to the computing entity as they are available, and the computing entity will incorporate them into its workload as they a) become necessary; or, b) are made available.

In the example of FIG. 8a, the UE 100 is transmitting data flow in the form of data segments as they are available. The data segments may correspond to data collected by the UE 100, or may be the result of a computation performed by the UE 100 based upon collected data and/or the previous response provided by the MEC-N 125. In an aspect, the data may be collected by the UE 100 after taking some action directed by the previous response provided by the MEC-N 125. In an aspect, the responses provided by the MEC-N 125 may comprise interim results based upon the previous data segment transmitted by the UE 100.

In step 805 the UE 100 transmits a first data segment from the data flow to the MEC-N 125. In step 807 the MEC-N 125 receives the first data segment and incorporates it in the NF computations. In parallel to the computations of the MEC-N 125, in step 808 the UE 100 performs computations on a different data segment. In step 809 the UE 100 transmits a result of its computations to the MEC-N 125. In step 810 the MEC-N 125 updates its computations with the received result of the UE's computations. In step 811 the MEC-N 125 continues its computations including the received result. In step 812 the MEC-N 125 transmits a response to the UE 100 in the form of an interim result and/or state data. In the embodiment of FIG. 8a, in step 815 the UE 100 incorporates the response into UE computations performed at the UE 100. Subsequent steps may continue the asynchronous computations performed by the UE 100 and the MEC-N 125.

FIG. 8b is a signalling diagram that illustrates a particular example of an asynchronous computing application. In the example of FIG. 8b, the UE 100 is able to make use of interim or partial responses provided by the MEC-N 125 based upon the scheduling of the UE 100. The signalling diagram begins after step 500 in which the NF has been offloaded onto the MEC-N 125, as described above. In step 820 the UE 100 buffers the data flow F[B, E]. In step 822 the UE 100 transmits the buffer status to the MM/SM 120. In step 824 the UE 100 transmits the buffered data segment F[B, E] to the MEC-N 125. The buffered data segment F[B, E] may more generally be referred to as a data update sent by the UE 100. In step 825 the MEC-N 125 performs computations using the data update. As described in more detail above, the MEC-N 125 performs periodic NF snapshots and transmits current state data to the UE 100. In the example of FIG. 8b, in step 826 the MEC-N 125 transmits a current snapshot of the NF along with accompanying state data to the NF state data-store. The NF state data-store is updated with the current snapshot in step 827, and may return an acknowledgement of the NF state update to the MEC-N 125. In step 828 the MEC-N 125 transmits a compute status update to the MM/SM 120. In step 830 the ME-N 125 transmits a data update acknowledgement to the UE 100. In an aspect, the acknowledgement may include updated state data corresponding to the snapshot and compute status update. In an aspect, periodic acknowledgements may include the updated state data. In an aspect, every acknowledgement may include the updated state data. In optional step 832, the UE 100 may flush, or partially flush, the buffer based upon the received data update acknowledgement. In an aspect, the UE 100 may further update a local state datastore based upon received state data included with the data update acknowledgement.

At step 835 the UE 100 receives or determines an update event. The update event may be the result, for instance, of received data, computation results performed by the UE 100, or an outside trigger. In response to the update event, in step 836 the UE 100 transmits a request for a current NF snapshot and interim results to the MEC-N 125. The MEC-N 125 obtains the current snapshot from the NF state datastore and in step 837 returns the current snapshot and associated information to the UE 100. In step 840 the UE 100 may then resume computations using the current snapshot, along with any update event information, such as received data. In parallel, in step 842 the MEC-N 125 may continue the computational task using the previous data segment, and continue to transmit the compute status to the MM/SM 120 (step 844), its snapshot including an interim result and updated state data to the UE 100 (step 846), and transmit snapshots to the NF state data-store for storage (step 847) as previously described.

Upon receipt of the update from the MEC-N 125, in step 850 the UE 100 may compare the received result with its locally computed result based upon the update event. If the received result is preferred, the UE 100 may discard the locally computed result. If the locally computed result is preferred, the UE 100 may reset the MEC-N 125 to use the updated information. The MEC-N 125 may be reset in step 855 by the UE 100 sending an interrupt command to the MEC-N 125. In the embodiment of FIG. 8b, a compute update trigger is transmitted in step 855 to the MM/SM 120 to forward in step 857 as a computation interrupt to the MEC-N 125. In an aspect, in step 858 the MM/SM 120 may update its round-trip delay time (RTT) tracking upon receipt of the compute update trigger, if relevant to the update event. In response to receiving the computation interrupt in step 860 the MEC-N 125 suspends its computational task. In step 862. The UE 100 provides an updated NF state based upon its locally computed result. The updated NF state may include an updated NF image, data, or other information required to bring the MEC-N 125 to the locally computed result by the UE 100. Upon receipt of the updated NF state, in step 863 the MEC-N 125 updates the NF state datastore and in step 865 resumes computations using the updated NF state. While not included in FIG. 8b for brevity, the interim result/state reporting may follow for the resumed computations, similar to the procedure described above. In step 870, the MEC-N 125 completes the computation. In step 871 the MEC-N 125 transmits a final compute status report to the MM/SM 120. In step 873 the MEC-N 125 sends a final response to the initial MEC session request including the final computed result, final data and/or the final NF state to the UE 100. The MEC-N 125 may also clear up resources by transmitting a release storage instruction in step 872 to the NF state data-base. In an aspect the NF state data-store may return an acknowledgement of the release storage instruction in step 874. In step 877 the MEC-N 125 releases computing resources allocated to the MEC session request. In step 875 the UE 100 may flush its buffer of flow data, and potentially state data. In step 880 the UE 100 acts on the received final result, or incorporates it into further computations.

Figure 9:
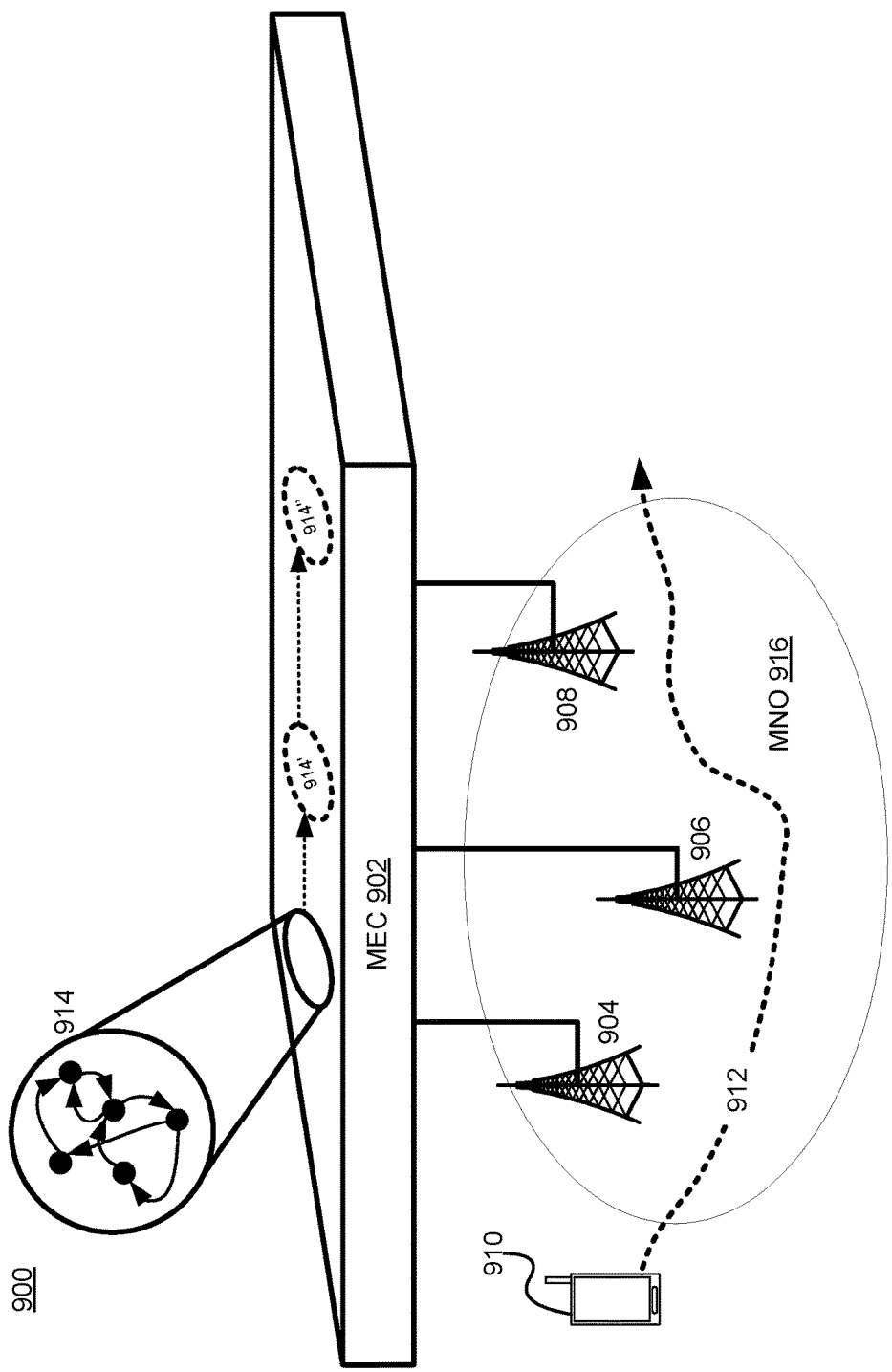
FIG. 9 is a block diagram illustrating the movement of a virtual network function through a MEC resource in accordance with a moving UE.

FIG. 9 is a block diagram illustrating an embodiment of a system 900 in which a network service provider makes use of MEC resource 902 which is connected to Access Points 906, 906, 908 in an Access Network (AN). The AN nodes may make sue of MEC 902 to process receives transmissions and to schedule and prepare data for transmission. Also illustrated is a UE 910 that moves through the coverage areas of the AN along a path 912. As UE 910 moves along path 912, it will be served by different APs, based on both the location of UE 910 and the other demands within the AN. A virtual network function 914 can be instantiated in MEC 902 to serve the needs of the UE 910. In one example, VNF 914 can be a user-specific gateway function, which may be modelled as a state machine. As the UE 910 moves along path 912, VNF 914 can also be moved to different locations within the MEC resource 902. If MEC 902 is a distributed computing resource, it may be composed of resources at different data centers. Moving VNF 914 to 914' and 914" may be done to reduce the inter-MEC network traffic or to ensure that communications latency is below a threshold. It should be understood that APs 1904 906 and 908 are part of a mobile network operator (MNO) 916. MEC 902 may also be a resource operated by MNO 916, and whose resources are dedicated to the services offered by MNO 916.

The movement of a VNF, such as VNF 914 through a MEC resource, or through other computing resource pools, is known in the art. The use of standard techniques of scaling out, scaling in, scaling up and scaling down can be applied to manage the movement of such virtual functions. In an environment in which virtualization is not employed, dedicated network functions can be made available at locations near the radio edge of a network. Resources within a dedicated function can be allocated to a specific UE, and in some embodiments isolated from the allocations to other purposes. The state of the dedicated function, as associated with the UE, can be moved from one dedicated function to another through the MEC resource 902 by transmitting the state information between dedicated functions. This allows movement of the function 914 dedicated to the UE 910 to other locations 914' and 914".

Where the state information is being used by a single MNO, and kept within a single MEC resource pool, there are few restrictions on how state information is moved. However, in an environment in which a UE moves across boundaries between different MEC resources, or different network operators, the movement of state information may be more constrained. In future heterogeneous networks, MEC resources may not be uniquely associated with MNOs, and questions about how to allow for the migration of UE specific functions to different MEC service providers and between different MNOs are to be addressed.

Figure 10:
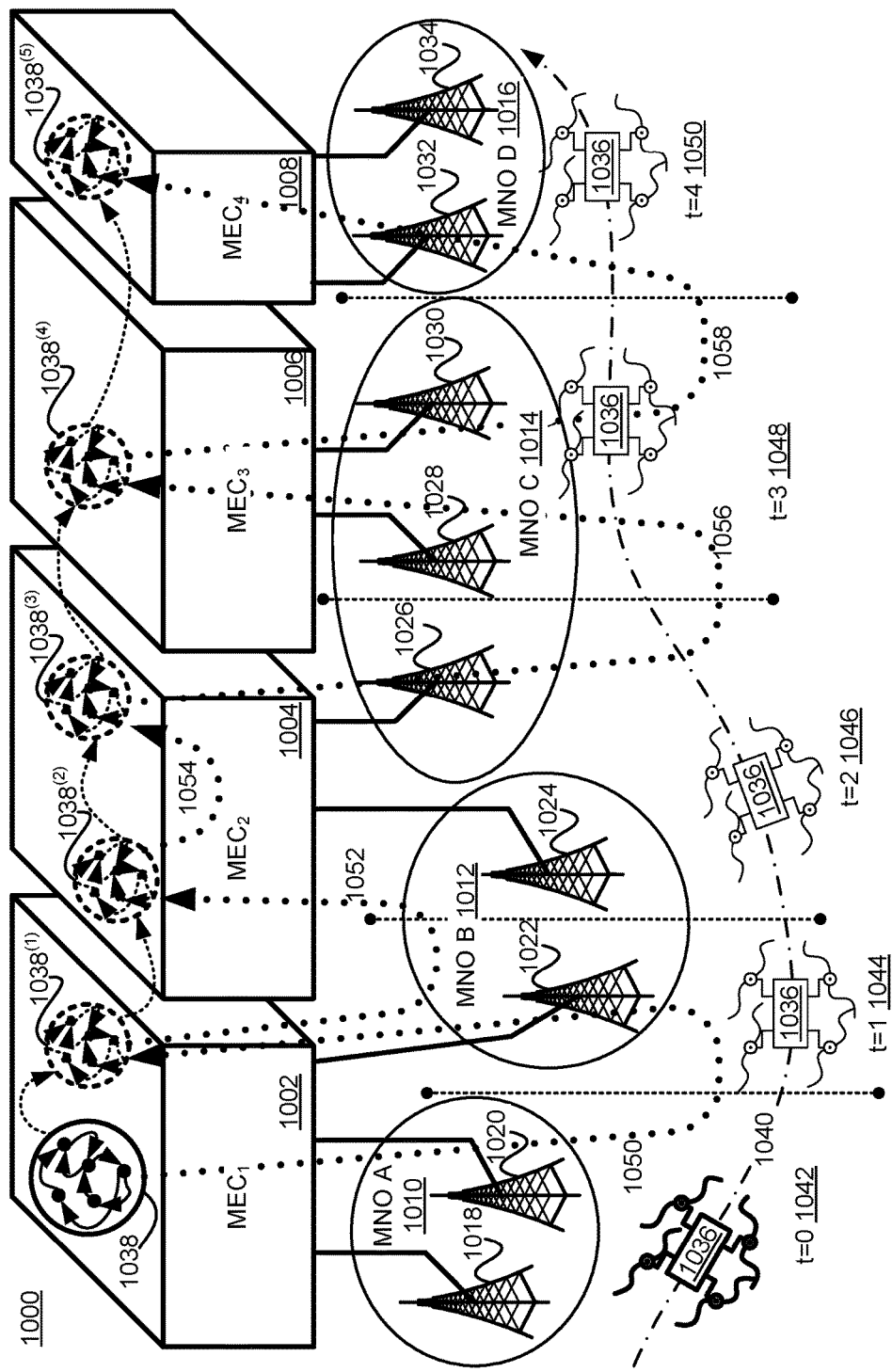
FIG. 10 is a block diagram illustrating the movement of a virtual network function through a plurality of MEC resources in accordance with the movement of a UE through a plurality of network operators.

FIG. 10 illustrates a system 1000, similar to FIG. 9, but where there are a plurality of different MEC service providers and a plurality of different MNOs. MEC resources MEC$_1$ 1002, MEC$_2$ 1004, MEC$_3$ 1006, MEC$_4$ 1008, each support different MNOs. MNO A 1010 is shown as wholly supported by MEC$_1$ 1002, which also supports part of the needs of MNO B 1012. MNO B 1012 is supported by MEC$_1$ 1002 and MEC$_2$ 1004. MNO C 1014 makes use of the resources of MEC$_2$ 1004 and MEC$_3$ 1006. MEC$_4$ 1008 is a dedicated resource of MNO D 1016, which does not make use of the resources of other MEC providers. As will be understood, each of the MNOs has a geographic coverage area, and as illustrated the MEC resources obtained by each MNO is based on a geographic (or topological) allocation. MNO A 1010 has AP 1018 and AP 1020 both of which connect to the MEC resources of MEC$_1$ 1002. MNO B 1012 has AP 1022 which uses resources of MEC$_1$ 1002, and AP 1024 which uses resources of MEC$_2$ 1004. MNO C 1014 has AP 1026 which uses the resources of MEC$_2$ 1004, and APs 1028 and 1030 which use the resources of MEC$_3$ 1006. MNO D 1016 has APs 1032 and 1034 which use the resources of MEC$_4$ 1008. It should be noted that as illustrated the resources of MEC$_3$ 1006 are dedicated to MNO C 1014, but MNO C 1014 does not exclusively rely upon the resources of MEC$_3$ 1006. There is an exclusive relationship between MEC$_4$ 1008 and MNO D 1016.

A UE 1036, illustrated as a remotely controlled aerial vehicle, can communicate to a trajectory controlling function (TCF) 1038 resident within a MEC service that is accessed through a radio access network. TCF 1038 can be either a virtual function, or it can be a dedicated function that can allocate resources to individual UEs (or in other examples dedicated to a particular service, class of services, or class of UEs). TCF 1038 has an associated state that can be used to in the migration of the function through MEC$_1$ 1004 and to other MEC service providers. At time t=0 the UE 1036 is at location 1042, and receives mobile network access services from at least one of AP 1018 and AP 1020. As UE 1036 moves out of the coverage of MNO A 1010 and into the coverage area of MNO B 1012 at time t=1 (location 1044) the state information of TCF 1038 may need to be moved to a different resource or location within MEC$_1$ 1002, illustrated as 1038$^{(1)}$. MEC$_1$ 1002 has agreements in place with both MNO A 1010 and MNO B 1012. Determining whether the state information can be migrated to a new function within MEC$_1$ 1002 when UE 1036 moves between MNOs, is a function of the agreements in place with the MNOs. In the illustrated embodiment, the agreements with the MNOs does not permit MEC$_1$ 1002 to transfer the state of a function associated with a first MNO to a function associated with a second MNO, MEC$_1$ 1002 can transfer the state of TCF 1038 to the UE, as illustrated in FIG. 7A. It should be understood that in this example, the initialization of the function does not need to begin with the UE 1036 transmitting a request to the MEC service, as the request to compute or manage a trajectory may come from a third party administering the vehicle. The transfer of the state information from TCF 1038 to the UE 1036 may be similar to the transmission of message 707 in FIG. 7A. UE 1036 may perform its own TCF operations as it is being handed over to MNO B 1012, similar to process 708 in FIG. 7A, although this is optional. As UE 1036 enters the service of MNO B 1012 it connects to AP 1022, and can transmit state information back towards MEC$_1$ 1002 so that the state information can be continued to be processed in TCF 1038$^{(1)}$. This transfer of state information is similar to message 709 in FIG. 7A, but where the MEC nodes are different. This can also be understood to be similar to the process illustrated in FIG. 4C, where MEC-N$_1$ 125$_1$ transfers state information to the UE 100 in message 415, and after connecting to AP$_2$ 110$_2$, the UE transmits data to MEC-N$_2$ 125$_2$ in message 425. It should be understood that where FIG. 4C indicates that message 425 includes the application VNF image, it is not strictly necessary in this embodiment.

As UE 1036 moves to region 1046 at time t=2, it passes from the service area of AP 1022 to the service area of AP 1024. As AP 1024 is connected to MEC$_2$ 1004, a transfer of the state information is required. Although UE 1036 has not left the service area of MNO B 1012, different nodes of MNO B 1012 are supported by different MEC service providers. To avoid having to create trust relationships between every MEC service provider, as the UE approaches the nodes that represent the edge of the connections to MEC$_1$ 1002, the state of TCF 1038$^{(1)}$ can be sent towards UE 1036. As UE 1036 is not leaving the service area of MNO B 1012, there are two possibilities. In a first embodiment, the state information can be sent to UE 1036 as discussed above. Alternately, a MM/SM function within MNO B 1012 can identify that the transfer of state information is required, and request, or direct another node to request, the transfer of the state information from MEC$_2$ 1004. In such an embodiment, the state information can be obtained by a node within MNO B 1012 and then transferred to MEC$_2$ 1004. This may reduce some of the latency associated with a transfer of the state information. Those skilled in the art will appreciate that in such an embodiment, a function such as the MM/SM function may be acting on behalf of the UE 1036.

After state information has been transferred, TCF 1038$^{(2)}$ can resume the trajectory control (which as will be understood by those skilled in the art will include messaging with the UE; this trajectory control information may be transmitted as user plane data). While in region 1046, UE 1036 makes the transition from the service area of MNO B 1012 to the service area of MNO C 1014. As noted above, when UE 1036 is handed over from one MNO to another, the manner in which the state is transferred may be impacted by the agreements in place between the MEC SP and the MNOs. For the purposes of illustration, MEC$_2$ can have agreements in place with the two MNOs, allowing for migration of state information to occur between TCF 1038$^{(2)}$ and TCP 1038$^{(3)}$ without using the UE as a conduit. As such, the state information can be transmitted using otherwise conventional techniques of migrating state information in a computing resource.

As UE 1036 moves so that at time t=3 it is in region 1048, another transfer of state must occur. In this example, the state information is transmitted to the UE 1036 so that it can be forwarded back through AP 1028 and into MEC$_3$ 1006 where it will be used by TCF 1038$^{(4)}$. As UE 1036 moves out of the service area of MNO C 1014 and into the service area of MNO D 1016, there is a transition of both MNO and MEC SP. The state of TCF 1038$^{(4)}$ is transmitted to UE 1036 which can then transmit the state information through AP 1032 into MEC$_4$, where it is used in TCF 1038$^{(5)}$.

Those skilled in the art will appreciate that as discussed with reference to FIG. 10, there are 5 different transfers of state. The first state transfer between TCF 1038 and TCP 1038$^{(1)}$ follows path 1050, where it is sent through MNO A 1010 to UE 1036, and then back through MNO B 1012. The second state transfer is between TCF 1038$^{(1)}$ and TCF 1038$^{(2)}$ which follow path 1052 from MEC$_1$ 1002 into MNO B 1012 and then to MEC$_2$ 1004. The third state transfer is between TCF 1038$^{(2)}$ and TCF 1038$^{(3)}$, which follows path 1054 through MEC$_2$. The following state transfer, between TCF 1038$^{(3)}$ and TCF 1038$^{(4)}$ follows path 1056 through MNO C 1014 to the UE 1036 and back through MNO C 1014 to MEC$_3$ 1006. The final state transfer is between TCF 1038$^{(4)}$ and TCF 1038$^{(5)}$ which follows path 1058 through MNO C 1014 to UE 1036 and back though MNO D 1016 to MEC$_4$ 1008.

Those skilled in the art will appreciate that although UE 1036 is subjected to handovers between different networks, and different access points, and it is these handovers that result in the need to transfer state information, the physical movement of a UE is not required. The UE must have movement relative to the topology of the network that it is connected to. For example, UE 1036 may be connected to AP 1022 and MNO B 1012 may initiate a handover to AP 1024 for any of a plurality of different reasons, including loading issues. The movement of UE 1036 from AP 1022 to AP 1024 may not involve physical movement, but still may result in a state information transfer.

Figure 11:
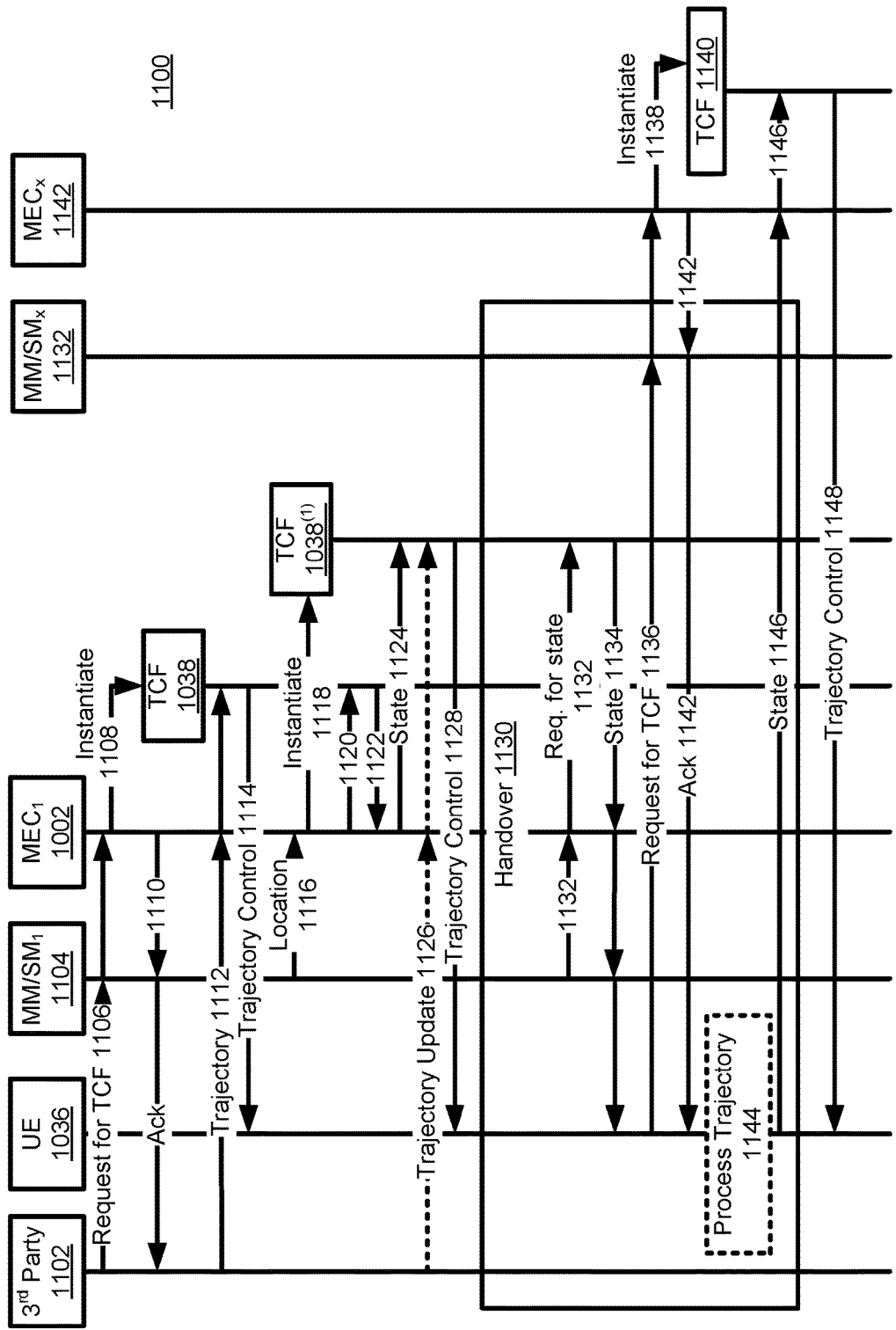
FIG. 11 is a signalling diagram illustrating the transfer of state using a method according to an embodiment.

FIG. 11 is a signalling diagram illustrating an exemplary method 1100 according to an embodiment. As noted above with respect to FIG. 10, a Third party 1102 may be responsible for initiating the request for a trajectory control function. In a managed fleet of autonomous vehicles (where each autonomous vehicle appears as a UE 1036 to the network), a central management entity, such as a fleet management entity, may act to transmit a request 1106 for a TCF to be assigned to the UE 1036. This request can be sent to an entity in the control plane of a network serving the UE 1036. In the illustrated embodiment of FIG. 11, the entity is illustrated as the MM/SM$_1$ 1104, but it should be understood that other entities can take on some or all of the responsibilities associated with this node. Upon receiving the request 1106, MM/SM$_1$ 1104 transmits a similar request to the MEC service provider MEC$_1$ 1002. As will be understood, the node within MEC$_1$ 1002 can vary with different implementations. The MEC$_1$ 1002 upon receipt of request 1106 instantiates an instance of TCF 1038 with command 1108. The MEC$_1$ issued an ACKnowledgement response 1110 which may include information instructing the third party 1102 or the MM/SM$_1$ 1104 how to interact with or reach TCF 1038. The third party 1102 can then transmit 1112 an initial trajectory to TCF 1038, which can use the received trajectory information (and other information such as the location of UE 1036) to generate trajectory control information, which is transmitted to UE 1036 as trajectory control message 1114. As the UE 1036 moves along the trajectory, the MM/SM$_1$ 1104 can provide location update information 1116 to MEC$_1$ 1002. This location information may be an absolute geographic reference, or a location with respect to the topology of the mobile network. MEC$_1$ 1002 can, in response to receiving location update 1116 determine that the TCF should be moved. A new TCF 1038$^{(1)}$ can be instantiated 1118. A request 1120 for the state information can be sent to TCF 1038, which can send the current state information 1122 in response. The received state information can be forwarded 1124 to TCF 1038$^{(1)}$. Those skilled in the art will appreciate that the state information 1122 could also be directly exchanged by the two TCFs in other embodiments. Optionally, a trajectory update message 1126 can be sent from the 3$^{rd}$ party 1102, and upon receipt by MEC$_1$ 1002, can be forwarded to the currently active TCF 1038$^{(1)}$. Trajectory control 1128 from TCF 1038$^{(1)}$ to the UE 1036 will continue providing the UE 1036 the control information. The above description can be understood to detail an embodiment of how the trajectory control information can be migrated within a MEC service provider. In 1130, the UE begins to move outside the coverage area of the first network provider, and into the service area of the second network provider (represented by MM/SM$_x$ 1132). Because, in this example, the trajectory is known in advance, the handover process can begin while the UE 1036 is still within the service area of the first network. In response to the start of handover 1130, the MM/SM$_1$ 1104 can transmit a request 1132 for the state information representative of the active TCF 1038$^{(1)}$. The state information 1134 can be sent from TCF 1038$^{(1)}$ to the UE 1036, and may pass through MEC$_1$ 1002 and the MM/SM$_1$ 1104 in some embodiments.

UE 1036 may transmit to the second network's MM/SM$_x$ 132, a request 1136 for TCF services. Those skilled in the art will appreciate that other nodes, including the 3$^{rd}$ party, may initiate this request in response to determining that the trajectory will take the UE 1036 outside the service area of the first network. The request 1136 may serve as the impetus for MEC$_x$ 1142 to issue an instruction 1138 to instantiate a TCF 1140 within the its network. Those skilled in the art will appreciate that it is not strictly required for MEC, 1142 to be different than MEC$_1$ 1002; as illustrated with the transition between MNO A 1010 and MNO B 1012 in FIG. 10.

MEC$_x$ 1142 transmits an ACK 1142 which can be relayed back to UE 1036. Receipt of the ACK 1142 can serve as a trigger for UE 1036 to transmit state information 1146 to the instantiated TCF 1140. Also illustrated is an optional step 1144 in which the UE 1036 continues the processing of the state information 1134 that it received. If the UE 1036 has continued processing the trajectory, the updated state information 1146 is transmitted. With the state information 1146, TCF 1140 can resume where the other TCF function left off, and issue trajectory control 1148 towards UE 1036.

Figure 12:
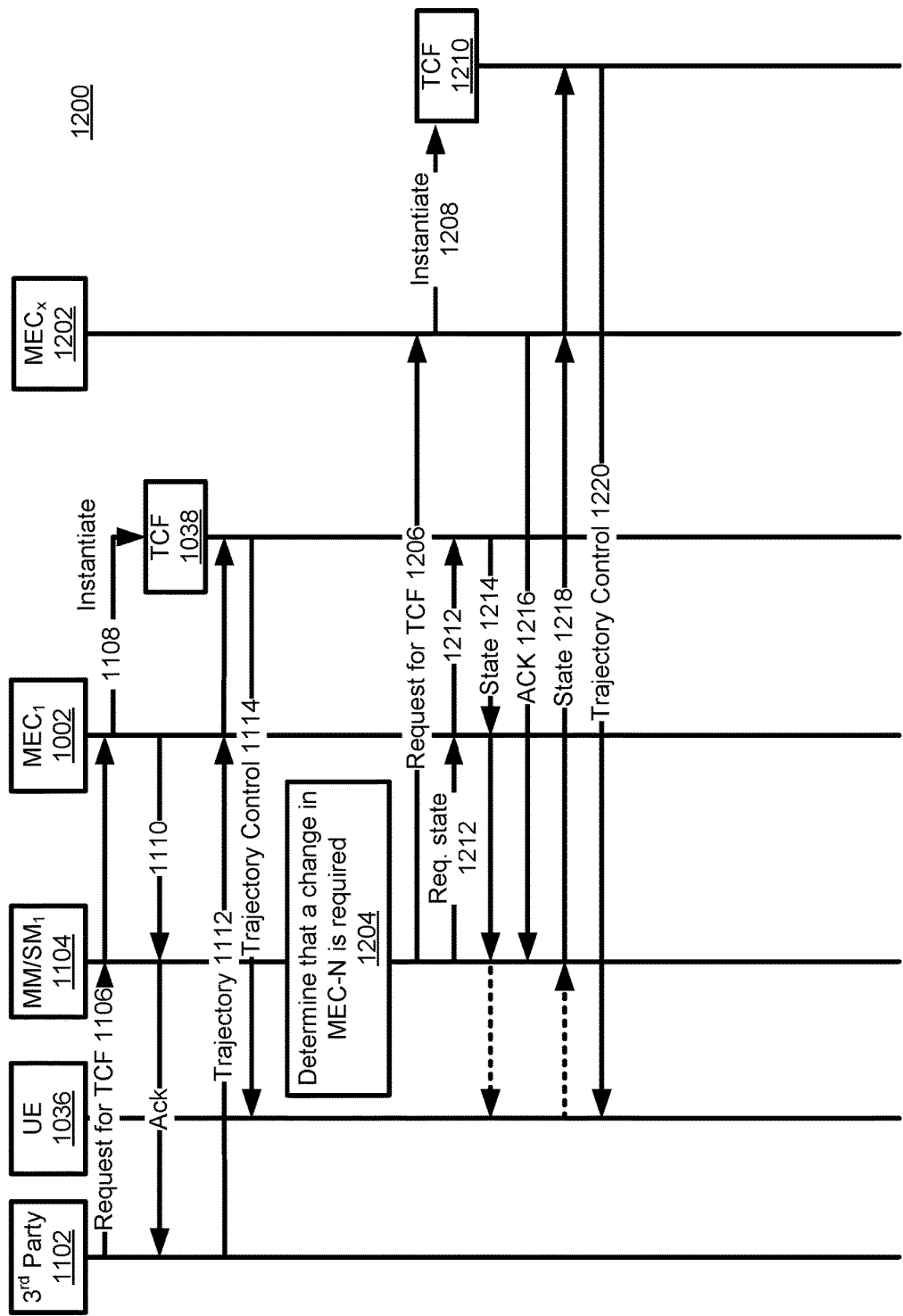
FIG. 12 is a signalling diagram illustrating the transfer of state using a method according to an embodiment.

FIG. 12 illustrates a signalling call flow 1200 in which state information is transferred from a TCF at a first MEC provider to a TCF at a second MEC provider, while remaining with the same network operator. The method starts with the same flows as provided in FIG. 11, with a request 1106 for TCF services, an instruction to instantiate 1108 a TCF function (TCF 1038), all leading to the issuance of trajectory control 1114. As the UE 1036 moves through the network, according to the assigned trajectory 1112, MM/SM$_1$ 1104 can determine 1202 that the TCF should be moved to a different MEC service provider, in this case MEC$_x$ 1202. It should be understood that the process of instantiating a function may be time consuming, so the request 1206 for TCF services from a second MEC provider MEC$_x$ 1202 may be issued in advance of the UE 1036 reaching the portion of the mobile network supported by MEC$_x$ 1202. Request 1206 is sent to MEC$_x$ 1202, and in response MEC$_x$ 1202 issues an instruction to instantiate 1208 a trajectory control function TCF 1210.

MM/SM$_1$ 1104 issues a request 1212 for current state information to active TCF 1038, which responds with state information 1214. The state information can be sent to MM/SM$_1$ 1104, or it may be sent down to UE 1036. If received by UE 1036, the state information may be further processed as illustrated in FIG. 11, but not shown here. Upon receiving acknowledgement 1216 from MEC$_x$ 1202 that TCF 1210 is active, state information 1218 is transmitted to TCF 1210. This state information allows TCF 1210 to resume where RCF 1038 left off, and issue trajectory control messages 1220 to UE 1036.

Figure 13:
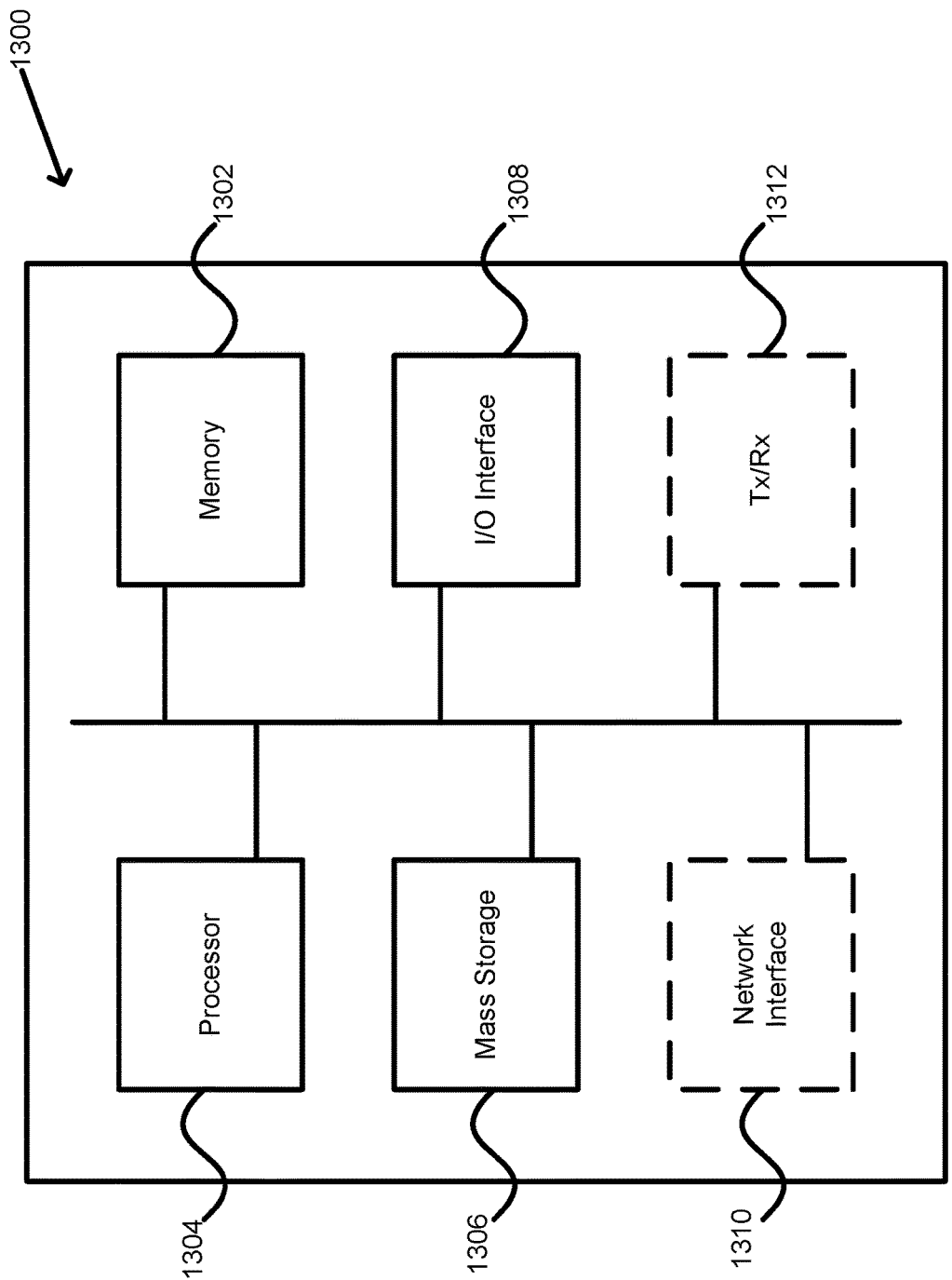
FIG. 13 is a block diagram illustrating a computing platform in accordance with an embodiment.

FIG. 13 is a block diagram that illustrates a computing device 1300 that can be used to implement the methods discussed above. The nodes discussed above can be implemented using variations of this computing device 1300. The device 1300 includes a memory 1302 and processor 1304. The processor 1304 executes instructions stored within memory 1302 to carry out the methods disclosed above. Software instructions and other information, including state information, may also be stored within mass storage 1306 which should be understood to include non-transient storage capabilities. An Input/Output interface 1308 allows for receipt of instructions directly from users and display of information to users. In embodiments where device 1300 is a UE, I/O interface 1308 may provide an interface to a touchscreen or other such interfaces. Optional network interface 1310 allows for connections such as wired and wireless network connections (e.g. Ethernet and WiFi connections), while Transmitter/Receiver 1312 (in some embodiments a transceiver, while in other embodiments separate transmitter and receiver devices) is an interface to a Radio Access Network connection which may include an interface to an antenna. In embodiments in which device 1300 is a UE, the Tx/Rx 1312 is present to allow for connection to the RAN. In other embodiments, such as those where device 1300 is part of a network that implements a virtual network function, The Network Interface 1310 may be required and may take the form of a wired network connection, such as an Ethernet network interface.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the claims.

We claim:

1. A method comprising:
    transmitting, by a user equipment (UE) to a mobility management/session management entity, a mobile edge computing (MEC) session request message;
    receiving, by the UE, a MEC session response message sent by the mobility management/session management entity, the MEC session response message including UE configuration information, the UE configuration comprising including an identifier of a MEC node assigned to the MEC session request and MEC hand-off trigger information;
    transmitting, by the UE to the MEC node identified by the identifier included in the UE configuration information, a software image of an application to be executed as a network function at the MEC node and data associated with the application;
    determining, by a UE, whether to send a hand-off request to the mobility management/session management entity based on the MEC hand-off trigger information and a location of the UE
    transmitting, by a UE, the handoff request to the mobility management/session management entity in response to determining to send the hand-off request to the mobility management/session management entity based on the MEC hand-off trigger information and a location of the UE; and
    receiving, by the UE, current state data sent by the MEC node, state data indicating a current state of the application being executed as a network function at the MEC node.

2. The method of claim 1, further comprising:
    continuing, by the UE, execution of the application from the current state using the state data.

3. The method of claim 2, wherein the MEC hand-off trigger information includes an identifier of a new MEC node, and wherein the method further comprises, transmitting, by the UE to the mobility management/session management entity, a new MEC session request including the identifier of the new MEC node.

4. The method of claim 1, further comprising transmitting, by the UE to the MEC node identified by the MEC node identification information, one or more of: binaries, libraries, pointers to binaries, and pointers to libraries associated with the application to be used by network function at the MEC node.

5. The method of claim 1, wherein the data associated with the network function is transmitted as data flow comprising a plurality of data flow segments.

6. The method of claim 1, wherein the MEC node is operated by a first MEC service provider and a second MEC node is operated by a second MEC service provider.

7. The method of claim 1, wherein the state data includes at least one of a state chronology identifier and a state identifier.

8. The method of claim 1, wherein the MEC session request includes estimated work load, required resources, and buffer size for the application.

9. The method of claim 1, wherein the UE configuration information included in the MEC session response message further includes: at least one of: a tracking area list (TAL) that includes access points (APs) that are proximate to a current location of the UE, and tracking area update (TAU) periodic timer.

10. A user equipment (UE) comprising:
    a processor;
    a non-transitory memory storing computer-readable instructions which, when executed by the processor, cause the UE to:
        transmit to a mobility management/session management entity, a mobile edge computing (MEC) session request message;
        receive a MEC session response message sent by the mobility management/session management entity, the MEC session response message including UE configuration information, the UE configuration information comprising an identifier of a MEC node assigned to the MEC session request and MEC hand-off trigger information;
        transmit to the MEC node identified by the identifier included in the UE configuration information, a software image of an application to be executed as a network function at the MEC node and data associated with the application;
        determine whether to send a hand-off request to the mobility management/session management entity based on the MEC hand-off trigger information and a location of the UE
        transmit the handoff request to the mobility management/session management entity in response to determining to send the hand-off request to the mobility management/session management entity based on the MEC hand-off trigger information and a location of the UE; and
        receive current state data sent by the MEC node, state data indicating a current state of the application being executed as a network function at the MEC node.

11. The UE of claim 10, wherein the memory stores further computer-readable instructions which, when executed by the processor, cause the UE to continue execution of the application from the current state using the state data.

12. The method of claim 11, wherein the MEC hand-off trigger information includes an identifier of a new MEC node, and wherein the memory stores further computer-readable instructions which, when executed by the processor, cause the UE to transmit to the mobility management/session management entity, a new MEC session request including the identifier of the new MEC node.

13. The UE of claim 10, wherein the memory stores further computer-readable instructions which, when executed by the processor, cause the UE to transmit to the MEC node identified by the MEC node identification information, one or more of: binaries, libraries, pointers to binaries, and pointers to libraries associated with the application to be used by network function at the MEC node.

14. The UE of claim 10, wherein the data associated with the network function is transmitted as data flow comprising a plurality of data flow segments.

15. The UE of claim 10, wherein the MEC node is operated by a first MEC service provider and a second MEC node is operated by a second MEC service provider.

16. The UE of claim 10, wherein the state data includes at least one of a state chronology identifier and a state identifier.

17. The UE of claim 10, wherein the MEC session request includes estimated work load, required resources, and buffer size for the application.

18. The UE of claim 10, wherein the MEC session response message further comprises: at least one of: a tracking area list (TAL) that includes access points (APs) that are proximate to a current location of the UE, and tracking area update (TAU) periodic timer.

\* \* \* \* \*